US010261749B1

(12) United States Patent
Wilcox et al.

(10) Patent No.: US 10,261,749 B1
(45) Date of Patent: Apr. 16, 2019

(54) AUDIO OUTPUT FOR PANORAMIC IMAGES

(71) Applicant: Google Inc., Mountain View, CA (US)

(72) Inventors: Eric Wilcox, San Francisco, CA (US); Thanh Tran, Mountain View, CA (US)

(73) Assignee: Google LLC, Mountain View, CA (US)

( * ) Notice: Subject to any disclaimer, the term of this patent is extended or adjusted under 35 U.S.C. 154(b) by 171 days.

(21) Appl. No.: 15/365,601

(22) Filed: Nov. 30, 2016

(51) Int. Cl.
*G06F 3/16* (2006.01)
*G06F 3/0485* (2013.01)
*G06F 3/0484* (2013.01)
*G06F 3/0488* (2013.01)
*G06K 9/00* (2006.01)

(52) U.S. Cl.
CPC .......... *G06F 3/165* (2013.01); *G06F 3/0485* (2013.01); *G06F 3/04845* (2013.01); *G06F 3/04883* (2013.01); *G06K 9/00671* (2013.01)

(58) Field of Classification Search
CPC .... G06F 3/165; G06F 3/04845; G06F 3/0485; G06F 3/04883; G06K 9/00671
See application file for complete search history.

(56) References Cited

U.S. PATENT DOCUMENTS

| 5,990,941 | A | * | 11/1999 | Jackson | ............ | G06F 17/30017 |
| | | | | | | 348/147 |
| 7,333,618 | B2 | | 2/2008 | Shuttleworth et al. | | |
| 8,488,014 | B2 | | 7/2013 | Chevallier et al. | | |
| 8,854,447 | B2 | | 10/2014 | Conness et al. | | |
| 9,143,880 | B2 | | 9/2015 | Vennström et al. | | |
| 9,204,042 | B2 | | 12/2015 | Rondinelli et al. | | |
| 2002/0103023 | A1 | * | 8/2002 | Matsuura | ................ | A63F 13/12 |
| | | | | | | 463/31 |
| 2003/0043815 | A1 | * | 3/2003 | Tinsley | .................. | G06F 9/451 |
| | | | | | | 370/395.21 |
| 2003/0159567 | A1 | * | 8/2003 | Subotnick | ............... | G06F 3/017 |
| | | | | | | 84/626 |
| 2004/0037540 | A1 | * | 2/2004 | Frohlich | .............. | G11B 31/006 |
| | | | | | | 386/285 |
| 2005/0099511 | A1 | | 5/2005 | Cazier | | |
| 2007/0011196 | A1 | | 1/2007 | Ball et al. | | |
| 2010/0321512 | A1 | * | 12/2010 | Chevallier | ............. | G03B 37/04 |
| | | | | | | 348/222.1 |
| 2011/0184539 | A1 | * | 7/2011 | Agevik | .................. | G11B 20/24 |
| | | | | | | 700/94 |
| 2012/0011464 | A1 | * | 1/2012 | Hayashi | ............. | H04N 1/00458 |
| | | | | | | 715/784 |
| 2014/0192230 | A1 | * | 7/2014 | Chang | .................. | H04N 1/2112 |
| | | | | | | 348/231.4 |

(Continued)

*Primary Examiner* — Mandrita Brahmachari
(74) *Attorney, Agent, or Firm* — IP Spring

(57) ABSTRACT

Implementations relate to audio output for panoramic images. In some implementations, a computer-implemented method includes causing a first portion of a panoramic image to be displayed by a display device of a user device, and receiving user input at the user device. Based on the user input, the method determines at least a part of a second portion of the panoramic image for display, the second portion associated with a first audio segment and a second audio segment, selects one of the first audio segment and the second audio segment, and causes a change in display of the panoramic image, where the change includes transitioning the display from the first portion to the second portion. The method causes output of the selected audio segment by an audio output device in communication with the user device.

16 Claims, 8 Drawing Sheets

(56) References Cited

U.S. PATENT DOCUMENTS

| | | | |
|---|---|---|---|
| 2014/0314391 A1* | 10/2014 | Kim | G11B 27/11 |
| | | | 386/248 |
| 2016/0092936 A1* | 3/2016 | Bharath | G06Q 30/0276 |
| | | | 705/14.66 |
| 2017/0062011 A1* | 3/2017 | Merrill | G11B 27/30 |
| 2017/0062012 A1* | 3/2017 | Bloch | G11B 27/34 |

* cited by examiner

AUDIO OUTPUT FOR PANORAMIC IMAGES

BACKGROUND

The popularity and convenience of digital camera devices as well as the widespread of use of Internet communications have caused user-produced visual content such as digital photographs and videos to become ubiquitous. For example, various types of images can be captured and displayed, including standard images and panoramic images providing larger views of image content, such as spherical images. For example, a panoramic image can depict an environment surrounding a camera, where the panoramic image can be mapped onto a display such that various different portions of the panoramic image can be displayed on a display screen. For example, some panoramic images can be viewed in 360 degrees.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to audio output for panoramic images. In some implementations, a computer-implemented method includes causing a first portion of a panoramic image to be displayed by a display device of a user device, and receiving user input at the user device. Based on the user input, the method determines at least a part of a second portion of the panoramic image for display, the second portion associated with a first audio segment and a second audio segment, selects one of the first audio segment and the second audio segment, and causes a change in display of the panoramic image, where the change includes transitioning the display from the first portion to the second portion. The method causes output of the selected audio segment by an audio output device in communication with the user device.

Various implementations and examples of the method are described. For example, in some implementations, selecting one of the first audio segment and the second audio segment is based on the user input. In some examples, the user input includes a gesture provided by a user on a touchscreen of the display device, and selecting one of the first audio segment and the second audio segment is based on a type of the gesture. In some examples, selecting one of the first audio segment and the second audio segment is based on a rate of the transitioning, and/or a direction of the transitioning.

In further examples, the first audio segment is associated with a first range of scrolling rate and the second audio segment is associated with a second range of scrolling rate, where the transitioning includes scrolling the panoramic image within a display view of the user device, and selecting one of the first audio segment and the second audio segment includes selecting the first audio segment in response to the scrolling of the panoramic image being at a rate within the first range of scrolling rate, and selecting the second audio segment in response to the scrolling of the panoramic image being at a rate within the second range of scrolling rate. In further examples, the first audio segment is associated with a first range of zooming rate and the second audio segment is associated with a second range of zooming rate, where the transitioning includes zooming the panoramic within a display view of the user device, and selecting one of the first audio segment and the second audio segment includes selecting the first audio segment in response to the zooming of the panoramic image being at a rate within the first range of zooming rate, and selecting the second audio segment in response to the zooming of the panoramic image being at a rate within the second range of zooming rate.

In still further examples, selecting one of the first audio segment and the second audio segment is based on one or more stored user preferences. In some implementations, the method further comprises determining at least one image characteristic associated with the second portion of the panoramic image, where selecting one of the first audio segment and the second audio segment is based on the at least one image characteristic associated with the second portion. In some implementations, selecting one of the first audio segment and the second audio segment is based on one or more device characteristics of the user device, where the device characteristics include at least one of: an orientation of the user device in space, and a sensed motion of the user device in space. In some implementations, selecting one of the first audio segment and the second audio segment is based on one or more current environmental characteristics of the user device, where the current environmental characteristics include at least one of: a current time, a current date, and a geographic location of the user device. In some examples, selecting one of the first audio segment and the second audio segment is based on an ambient sound level surrounding the user device. In some implementations, selecting one of the first audio segment and the second audio segment is based on a respective priority level associated with each of the first audio segment and the second audio segment.

In some implementations, the first audio segment is associated with a first trigger condition, and the second audio segment is associated with a second trigger condition, where the first trigger condition is different than the second trigger condition, and selecting one of the first audio segment and the second audio segment is based on whether the first trigger condition is satisfied and whether the second trigger condition is satisfied. In some implementations, causing the first portion of the panoramic image to be displayed includes causing a spherical display of the first portion, and wherein the transitioning the display from the first portion to the second portion includes causing a spherical display of the second portion.

In some implementations, a device includes a memory, a display device, an audio output device, and at least one processor coupled to the display device and the audio output device configured to perform operations including causing a first portion of a panoramic image to be displayed by the display device and receiving user input at the device. The operations include, based on the user input: determining at least part of a second portion of the panoramic image for display, the second portion associated with a first audio segment and a second audio segment, detecting at least one image content feature depicted in the at least part of the second portion of the panoramic image, and selecting one of the first audio segment and the second audio segment based on the at least one image content feature. The operations include causing a change in the display of the panoramic image to show the at least part of the second portion of the panoramic image by the display device. The operations include causing output by the audio output device of the selected one of the first audio segment and the second audio segment.

Various implementations and examples of the system are described. For example, in some implementations, the processor is further configured to perform the selecting one of the first audio segment and the second audio segment to include: determining one or more image content categories of the at least one image content feature, and determining which of the first audio segment and the second audio segment is triggered by the one or more image content categories, where the selected audio segment corresponds to the triggered one of the first audio segment and the second audio segment. In some examples, the one or more image content categories of the at least one image content feature include daytime, night time, weather, indoor location, and/or outdoor location. In some implementations, the processor is configured to perform the determining which of the first audio segment and the second audio segment is triggered by the one or more image content categories to include determining one or more audio categories for the first audio segment and the second audio segment, and determining which of the one or more audio categories is associated with the one or more image content categories based on stored associations, where the triggered one of the first audio segment and the second audio segment has the associated one or more audio categories. In some implementations, the processor is configured to perform the selecting one of the first audio segment and the second audio segment further based on the change in the display of the panoramic image caused by the user input.

In some implementations, a non-transitory computer readable medium has stored thereon software instructions that, when executed by a processor, cause the processor to perform operations. The operations include receiving a selection of a portion of a panoramic image, wherein the selection is based on first user input received by a user device; determining at least one image content feature depicted in the portion of the panoramic image; determining, by at least one hardware processor, a plurality of suggested audio segments based on the at least one image content feature; displaying the plurality of suggested audio segments by a display device of the user device; receiving a selection of at least one selected audio segment of the plurality of suggested audio segments, where the selection is based on second user input received by the user device; and associating the at least one selected audio segment with the portion of the panoramic image, where the at least one selected audio segment is configured to be output by an audio output device in response to at least part of the portion of the panoramic image being displayed in a display view of the display device.

Various implementations and examples of the system are described. In some examples, the processor further performs operations comprising receiving third user input that specifies one or more attributes for the at least one selected audio segment, where the one or more attributes include one or more trigger conditions indicating one or more conditions to cause the output of the at least one selected audio segment in response to the display of the at least part of the portion of the panoramic image in the display view.

DETAILED DESCRIPTION

Figure 1:
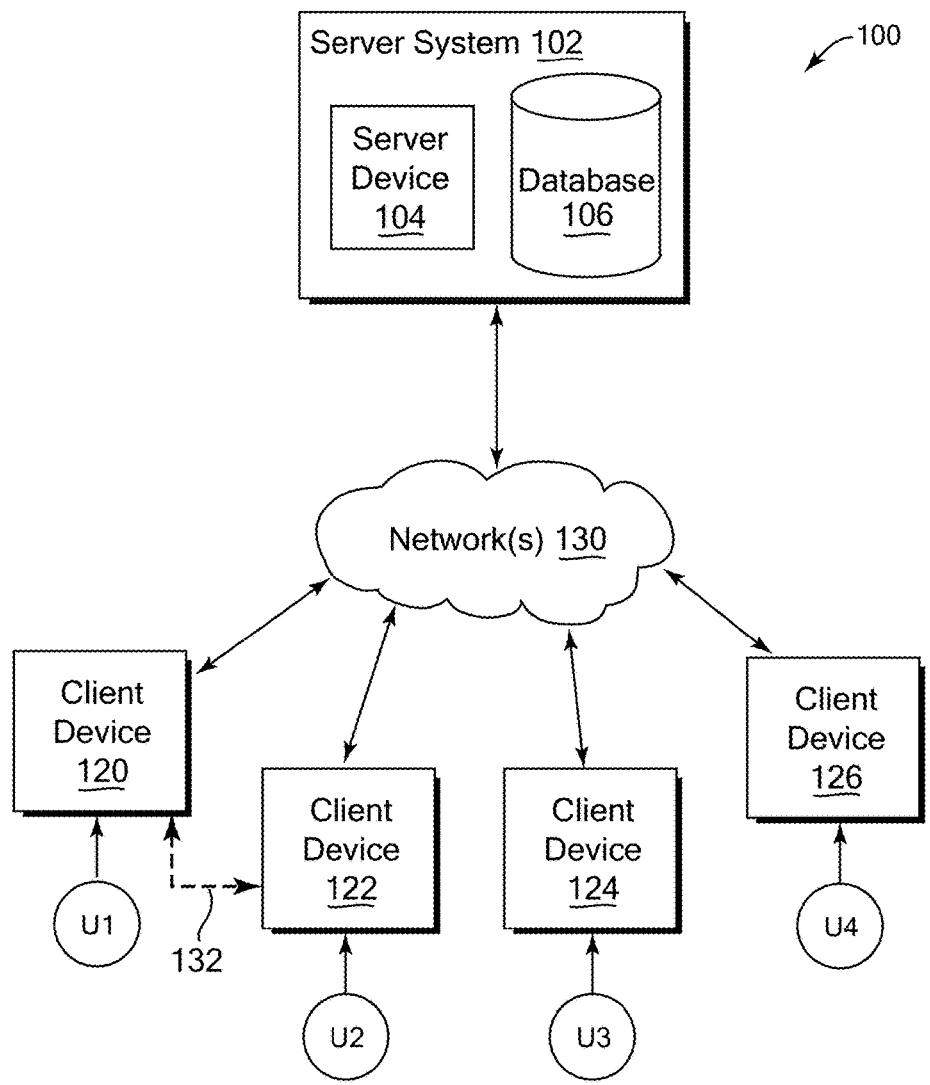
FIG. 1 is a block diagram of example systems and a network environment which may be used for one or more implementations described herein.

One or more implementations described herein relate to audio output for panoramic images. In some implementations, a first portion of a panoramic image is displayed by a display device of a user device. For example, the panoramic image can be a spherical image providing a 360-degree view of the image content, or other type of panoramic image. User input is received at the user device. Based on the user input, at least a part of a second portion of the panoramic image is determined for display. The second portion of the image is associated with a first audio segment and a second audio segment (e.g., data segments such as audio segments, etc.), and one of these audio segments is selected. A change in display of the panoramic image is provided, including transitioning the display from the first portion to the second portion of the image. In addition, the selected audio segment is output by an audio output device such as one or more speakers of the user device.

Various additional features are described. For example, selecting one of the first audio segment and the second audio segment can be based on the user input, e.g., based on a type of user input such as a type of gesture, a direction of input on a touchscreen, or other input. The selection of first or second audio segment can be based on a rate or direction of the transitioning of the display to the second portion. In some examples, the transitioning can include scrolling the display view from the first image portion to the second image portion, and the rate of the scrolling can determine which audio segment is selected. In other examples, the transitioning can include panning, tilting, or zooming the display view from the first image portion to the second image portion. For example, each audio segment can be associated with a range of scrolling, panning, zooming, etc.

The selection of the first or second audio segment can be based on one or more of a variety of characteristics or factors. For example, the selection can be based on one or more stored user preferences. In some examples, the selection can be based on at least one image characteristic of the second image portion (and/or of the first image portion), e.g., an image content feature (or type or category of image content feature) depicted in the image, color, brightness, etc. In some examples, the selection of the first or second audio segment can be based on one or more device characteristics of the user device, e.g., orientation or motion of the user device in space, memory or processing characteristics, events, notifications, or other states of the user device, etc. In some examples, the selection can be based on one or more environmental conditions of the user device, e.g., the current time, current date, geographic location, ambient sound level surrounding the device, etc. Some implementations can selecting one of the first and second audio segments based on a priority level associated with each of the first and second audio segments.

In some implementations, a user interface can be provided that can receive user input to determine audio segments for portions of a panoramic image. For example, user input can select a portion of a panoramic image displayed in a user interface. At least one image content feature can be depicted in the portion of the panoramic image. A set of suggested audio segments can be determined based on the at least one image content feature and displayed in the user interface. The user interface can receive a selection of at least one of the audio segments based on user input, and the selected audio segment can be associated with the portion of the panoramic image. The associated audio segment is configured to be output by an audio output device in response to at least part of the portion of the panoramic image being displayed in a display view of the display device. In some implementations, user input received in the user interface can specify one or more attributes for the at least one selected audio segment. For example, the one or more attributes can specify trigger conditions that cause the associated audio segment to be output during the display in a display view. The associated audio segment and the attributes can be stored in association with the portion of the panoramic image.

One or more features described herein allow audio segments to be output in correlation with the display of portions of panoramic images. Audio segments can be output based on any of a variety of factors related to the display of the image and/or the device, including user input affecting the image display, characteristics of the image, characteristics of the device, etc. Multiple audio segments can be associated with a particular portion of a panoramic image, allowing varied and interesting audio to be output in association with particular image portions and under different conditions. Further, a user interface can be provided allowing a user to associate audio segments with portions of panoramic images and specify the conditions of audio output in straightforward, efficient, and intuitive ways. Various features provide options to cause output any of multiple accessible sound segments for panoramic images.

As described herein, panoramic images can be associated with audio segments such as sound effects, songs, background sounds, etc. that are output when viewing particular portions of the images in specified manners or based on other image or device characteristics. Some described panoramic images, when displayed, can present a panoramic image area that is a virtual area or space to a viewing user and can include various image portions at respective orientations. When viewed with an immersive device, such as a virtual reality display device, some panoramic images can provide a vivid experience of an arbitrary three-dimensional space including associated audio. Features described herein permit users to generate panoramic images that permit creative possibilities of combining images and audio in a variety of ways that are chosen by the users. For example, panoramic images with associated audio content as described herein can be used as a form of expressing oneself, e.g., a user may provide a shared panoramic image that includes audio content provided in an image that can be viewed with a display device or virtual reality device. Further, users can collaboratively generate or edit panoramic images with selected audio segments, interact with each other's panoramic images and audio segments, etc.

Described features can provide display of panoramic images and associated output of audio segments in an immersive and effective manner. Described features can allow a device to output different audio segments based on the display of a portion of a panoramic image and based on a variety of user input and image and device characteristics, providing output of audio segments that are appropriate in various viewing contexts. Audio is thus output in conjunction with panoramic images with relevance and variety, allowing greater immersion and interest of users when viewing panoramic images. Described techniques provide enhanced output of audio in conjunction with display of panoramic images by a device. Described techniques allow reduction or avoidance of the need to run multiple applications or processes and/or to perform complex and technical user commands providing correlated image and audio output from a device. Further, described features allow a user to specify attributes of audio segments in a highly customized manner using a user interface. Described techniques allow reduction or avoidance of complex editing functions to determine and output audio that is relevant to particular portions of a panoramic image and to specify conditions of audio output relative to panoramic image display.

Consequently, a technical effect of one or more described implementations is that a variety of audio output is enabled in multiple different interface and device contexts with regard to the display of various portions of a panoramic image. An additional technical effect of one or more described implementations is that display of panoramic images in conjunction with related audio is achieved with less computational time and resources to obtain combined audio and visual user experience from devices as compared to devices using convention display and output techniques. An additional technical effect of one or more described implementations is that selection and modification of audio segments in association with portions of panoramic images are achieved with less computational time and resources expended to obtain results as compared to conventional editing and coding systems. For example, a technical effect of described features is a reduction in the consumption of system processing resources utilized to associate audio segments to panoramic images than in a system that does not provide one or more of the described features.

A panoramic image, as referred to herein, is a digital image having multiple pixels as specified by pixel values, and which can provide an extended or wide view of image content such that a portion of the panoramic image is displayed in a displayed view. Different portions of the panoramic image can be displayed by moving (e.g., scrolling, panning, tilting, zooming, etc.) the view within a defined panoramic image area (e.g., viewable display area) of the panoramic image. For example, the panoramic image area can be displayed as one or more simulated surfaces. In some examples, a panoramic image such as a spherical image can be presented in a three-dimensional spherical form by a particular display technique. In some examples, a displaying device can display a spherical image (e.g., provide spherical display) by displaying the image content of the spherical image as if projected on the inside surface of a sphere, where the viewer is positioned at or near the center of the sphere. In some examples, a panoramic image, when rendered, can provide a 360-degree spherical view around a viewing point in multiple directions, or can provide a portion of such a full 360 degree view (e.g., a 180 degree or hemispherical view, 270 degree view, etc.). In various implementations, a panoramic image can be presented in a partially spherical form, e.g., a half-sphere, or other partially spherical shapes. In some implementations, the panoramic image can be presented in other three-dimensional forms, such as ovoid, cylinder, cube, polyhedron, etc. In various implementations, the three-dimensional form can have a smooth surface, a contoured surface, etc. In various implementations, a panoramic image can include image content from captured physical space, from created virtual or artificially-created scenes, or a combination of captured and created content.

In some examples, various portions of the panoramic image can be displayed in a display view over time, e.g., via automatic or predetermined scrolling (e.g., simulated panning, tilting, and/or zooming) of the display view within the panoramic image area and with respect to the image content, or user-directed scrolling (e.g., panning, tilting and/or zooming) of the display view. In another example, image content of a panoramic image can be displayed scrolling or otherwise moving in a particular direction within a display view.

In some implementations, a panoramic image can be stored as a single planar, rectangular image, e.g., a group of pixels arranged in a rectangular form, or in another two-dimensional form. A display technique can convert the image data by using conversion techniques from the rectangular form to the panoramic display form. For example, a spherical image can be in stored in a rectangular, two-dimensional form, e.g., an equirectangular projection image. For example, in some implementations the rectangular image for a spherical panoramic image can have an aspect ratio of 2:1 horizontal length to vertical length as in a particular spherical image standard, where this aspect ratio is used to completely envelop a 360-degree spherical view. In some implementations, a portion of the panoramic image can be displayed by a viewing program interface, and different portions of the panoramic image can be displayed based on user input, program settings, etc. Some implementations can divide the single image into multiple images, e.g., for storage, for transmission, etc.

In some implementations, a panoramic image can be a panoramic image montage or image montage, which is a collection of multiple image components (including still images, animations, videos, etc.) organized into a single presentation. The presentation can be stored as a single image including the collection of images as various portions of the single image (or a number of such images, each having multiple images of the image montage). Alternatively, the presentation can be stored as multiple individual component image portions, e.g., images or videos, that are displayed in a particular configuration so as to appear part of a single image montage. In some implementations, the image portions can be associated with respective orientations. The presentation can be displayed such that an image portion is displayed in a location corresponding to the orientation for that image portion. The image portions collected in the montage can be positioned within the montage to appear adjacent, e.g., stitched together, and/or have space between them. Image portions included in the image montage can depict image content that is continuous across multiple adjacent image portions, e.g., multiple images displayed adjacently to depict adjacent portions of a scene like a continuous landscape, or can depict image content that is different across multiple adjacent image portions, e.g., scenes captured at different times and/or different geographic locations and displayed adjacent to each other. Image content data provided in the panoramic image montage can include still images, video data, animated images (e.g., cinemagraph), or other forms of image content.

In some implementations, a video clip or animated image can be played within a defined area at a static location within a panoramic image. One or more successive image frames can be displayed within the defined area to display the animation over time. In some implementations, the image frames can be looped for a particular number of times or perpetually, where a sequence of image frames is played back again from a start image frame after an end image frame is displayed.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 can also include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable device (e.g., handheld), cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. A client device can be a mobile device that can be any handheld or wearable device. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some example implementations, users U1, U2, U3, and U4 may interact with each other via applications running on respective client devices and/or server system 102. In some implementations, the interaction may be performed via a network service, e.g., a social network service or other type of network service implemented on server system 102. For example, respective client devices 120, 122, 124, and 126 may communicate data to and from one or more server systems (e.g., server system 102). In some implementations, server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, video, image montages, audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images (including panoramic images as described herein), video sequences, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of image content data including images, video data, and other content as well as enable communication data, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, such as one or more display screens, projectors, etc. In some implementations, application programs running on a server system can communicate with a client device to receive user input at the client device and to output data such as visual data, audio data, etc. at the client device.

In some implementations, server system 102 and/or one or more client devices 120-126 can provide a display application and/or an editing application. The display application may allow a user device to display image content such as panoramic images by display devices and output audio segments by audio output devices as described herein. The application can allow a device to output various data, e.g., display video, images, text, and other data and output audio received by the client device running the application, where the video, images, and audio can be obtained from local and/or remote storage and/or over the network 130. The editing application can provide an associated user interface that is displayed on a display device associated with the server system or client device. The user interface may provide various display functions (e.g., display modes) for content including panoramic images and audio segments, as well as editing functions, some of which are described herein. In some implementations, the user interface can receive user input that allows display and editing features as described herein.

Various implementations of some features described herein can use any type of system and/or service. For example, photo collection services or other networked services (e.g., connected to the Internet) can be used. Any type of electronic device can make use of features described herein. Some implementations can provide features described herein on client or server devices disconnected from or intermittently connected to computer networks. In some examples, a client device including or connected to a display device can process and display data stored on storage devices local to the client device (e.g., not connected via a communication network) and can provide one or more features and results as described herein that are viewable to a user.

Figure 2:
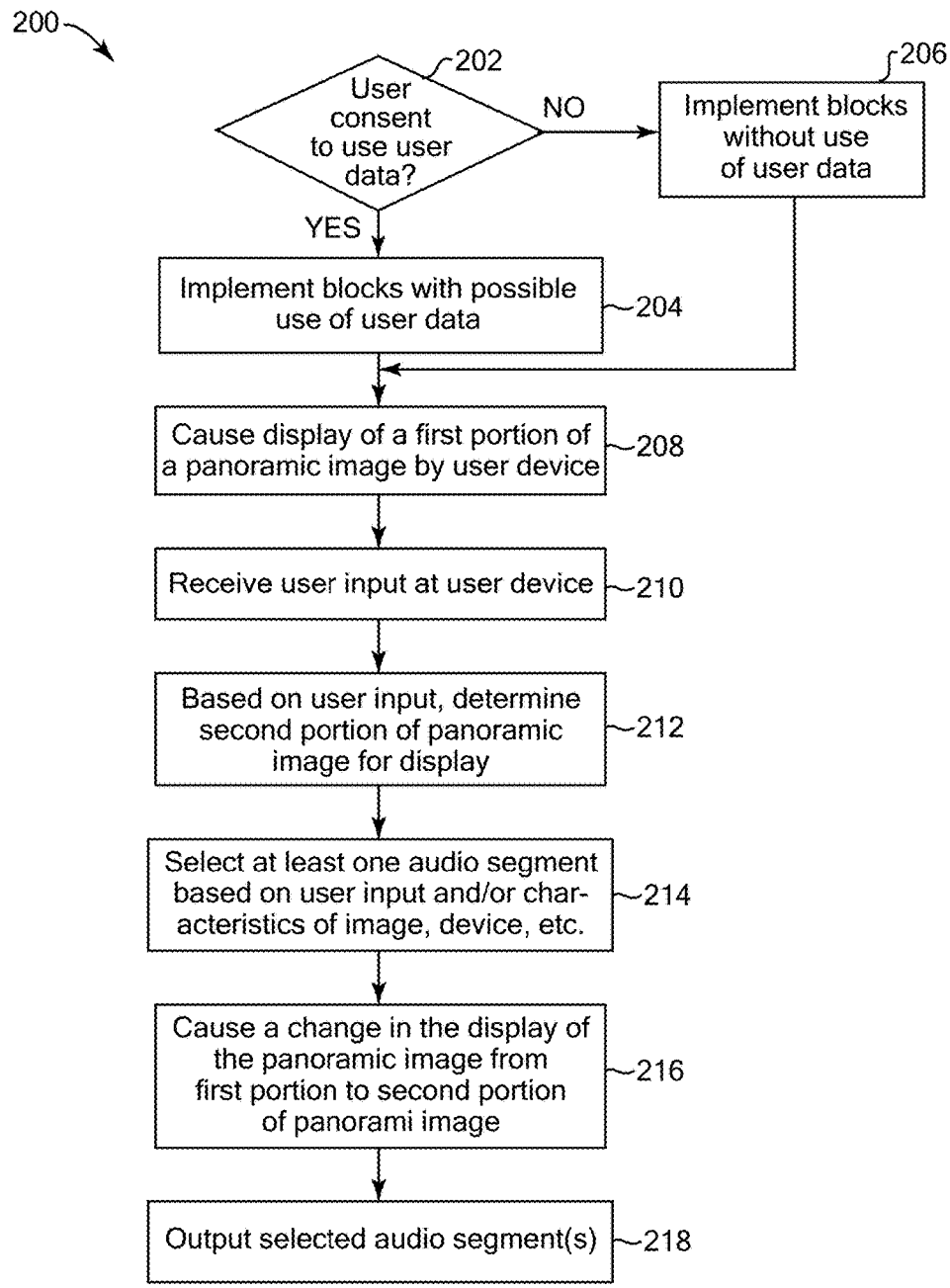
FIG. 2 is a flow diagram illustrating an example method to output portions of panoramic image and audio segments associated with the panoramic image, according to some implementations.

FIG. 2 is a flow diagram illustrating one example of a method 200 to output portions of panoramic image and audio segments associated with the panoramic image. In some implementations, method 200 can be implemented, for example, on a server system 102 as shown in FIG. 1. In some implementations, some or all of the method 200 can be implemented on a system such as one or more client devices 120, 122, 124, or 126 as shown in FIG. 1, and/or on both a server system and one or more client systems. In described examples, the implementing system includes one or more processors or processing circuitry, and one or more storage devices such as a database 106 or other accessible storage. In some implementations, different components of one or more servers and/or clients can perform different blocks or other parts of the method 200.

In block 202, it is checked whether user consent (e.g., user permission) has been obtained to use user data in the implementation of method 200 (including method 300, described below). For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, blocks are to be implemented without use of user data and with generic or publicly-usable data.

In block 208, a display is caused of a first portion of a panoramic image by a display device of a user device. As described herein, a portion of a panoramic image is displayed by the display device, e.g., in a display view, while one or more other portions of the panoramic image are not displayed. For example, a portion of a panoramic image can be displayed in a display view of the display device. In various examples, the display view can cover a partial or entire area of a display screen of the user device. In some examples, the display view can be displayed in window or other specified area of a display screen or other display area. In some implementations, the display view is provided on a display screen (or other display output area) of a mobile device, e.g., a mobile phone, tablet, goggles or glasses, etc. For example, the mobile device can be any of client devices 122, 124, 126, or 128.

In some implementations, the displayed first portion of the panoramic image is a particular area of the entire display area of the panoramic image. In some implementations, the first portion can be an area of the panoramic image that coincides with the area of the display view, e.g., the displayed area of the image. In some implementations, the first portion of the panoramic image can be determined based on a center of the display view, e.g., a predetermined area (e.g., circular radius or other shape) around the center of the display view defines the first portion. The first portion can have any suitable shape, e.g., rectangular, square, oval, irregularly shaped, etc. In some implementations, the displayed first portion is a particular object, area, region, or other image content feature depicted in the panoramic image and displayed in the display view, or is a displayed portion of that content feature. In some implementations, the image content feature can be detected by one or more image recognition techniques used by the system. For example, the first portion can be a displayed portion of an image content feature having the largest area shown in the display view, or a displayed portion of an image content feature that is covering the center of the display view.

In some mobile device examples, the displayed first portion of the panoramic image can be based on an orientation of the device in space, and/or can be based on an orientation of a camera (e.g., a camera on the user device). In some examples, the orientation of the mobile device can be determined from sensor data obtained from one or more sensors of the device (e.g., one or more accelerometers and/or gyroscopes). For example, each portion of the panoramic image can correspond to a particular orientation. In some examples, a user of the user device can hold the user device at a particular orientation in space, and a designated portion of a spherical panoramic image that corresponds to that orientation can be displayed in the display view, where different orientations in space correspond to different portions of the panoramic image. In another example, a mobile device, such as a smartphone, may be placed inside an enclosure that may be worn by a user. For example, the mobile device may be placed in a wearable frame that can be worn by a user, such that a display screen of the mobile device is placed in front of a user's eyes. In these examples, one or more lenses may be included, e.g., within the enclosure, to provide an immersive viewing experience for a user. For example, if the device is a wearable device, e.g., a head-worn device such as goggles, glasses, head-mounted displays, etc., a user of the device can move or tilt their head in a particular direction (at a particular orientation) and the displayed portion of the panoramic image corresponds to the orientation of the display screen and the head position. In some examples, the user may utilize an input device, e.g., integrated with or separate from the mobile device, to specify the orientation and/or displayed portion of the panoramic image. For example, gesture detection can be performed to determine an orientation based on one or more gestures performed by a user. In some examples, gestures may be detected by a wearable device that is separate from the mobile device, e.g., one or more rings worn on fingers, wrist-worn devices, etc.

In additional examples, the first portion of the panoramic image can be displayed in a display view that is an area of a display screen of a non-portable device, e.g., a display monitor in communication with a desktop computer or other non-portable device. In some non-portable device examples, the first portion of the panoramic image can be displayed based on received commands or data. For example, user input can specify particular orientation, rotational angles or angular positions in one or more rotational planes for a spherical image, or a particular area that is included in the first portion of the panoramic image. In some examples, a user can drag a touch (e.g., with a finger) over a touchscreen input device or move a cursor over a display screen based on an input device such as mouse, trackpad, joystick, etc., and this user input can indicate or specify the first portion of the panoramic image that is displayed.

In block 210, user input is received at the user device. The user input can be in any of a variety of different forms. For example, the user input can include touch input, e.g., a user's finger or other appendage tapping, swiping, or providing another gesture on a touchscreen, a trackpad, or other input device of the user device or other device in communication with the user device. The user input can include input provided from a controller, e.g., mouse, joystick, trackball, etc. In some implementations, the user input can include voice input, e.g., speech sensed by one or more microphones (e.g., of the user device) and converted to text and/or commands by one or more voice recognition techniques and software. In some implementations, the user input can include sensed motion of the user device as detected by one or more sensors (e.g., accelerometers and/or gyroscopes). For example, one or more motion commands input based on a particular motion of the device as provided by the user (e.g., a particular amplitude and/or frequency of shaking the device, rotating the device in space, etc.). Generally, "user input," as referred to herein, can include any one or more of these types of input.

In block 212, a second portion of the panoramic image is determined for display in the display view, based on the user input received in block 210. For example, in some implementations, the received user input can include a command to change the display view from a display of the first portion of the panoramic image to a display of the second portion of the panoramic image. In some implementations, the second portion of the panoramic image is a particular area of the panoramic image. For example, in some implementations, the second portion can be an area of the panoramic image that coincides with the area of the display view, e.g., the area of the image displayed in the changed display view. In some implementations, the second portion of the panoramic image can be determined based on a center of the changed display view, e.g., a predetermined area (e.g., radius or other shape) around the center of the changed display view defines the second portion. The second portion can have any suitable shape, e.g., rectangular, square, oval, irregularly shaped, etc. In some implementations, the second portion is or includes a particular object, region, or other feature depicted in the panoramic image and displayed in the changed display view, or a displayed portion of that feature, where the feature was detected by one or more image recognition techniques used by the system. For example, the second portion can be a displayed portion of a feature having the largest area shown in the display view, or can be a displayed portion of a feature having an area covering the center of the display view, etc. In some cases or implementations, if the user input commanded a zoom operation, the second portion of the panoramic image can be a sub-portion of the first portion (e.g., if the zoom is a zoom in) or can be a larger portion of the panoramic image that includes the first portion (e.g., if the zoom is a zoom out).

In some examples, the user input is provided in a form that causes the change in display from the first portion to the second portion. For example, the user input can include a touch (e.g., finger) movement over a touchscreen that provides a command to cause the panoramic image to be scrolled (or panned or tilted) in the display view in a direction based on the direction of the touch movement and by an amount based on the length and/or speed of the touch movement on the screen. The second portion of the image is determined based on this direction and amount. For example, the touch movement may have instructed a change in a display orientation of a displayed spherical panoramic image such that a second portion of the spherical panoramic image corresponding to the new orientation is to be displayed.

In further examples, the user input can select a graphical button (or can be input caused by the user pressing a physical button) to command a second portion of a panoramic image to be displayed, e.g., commanding a change from the first portion that is a first area of the panoramic image, to the second portion that is a second, different area of the image. For example, the selection of the button may command a predetermined portion of the panoramic image to be displayed, e.g., a second portion of a spherical panoramic image that is oriented 180 degrees in a predetermined direction from the first portion. In further examples, the user input can be based on the user input having selected and moved a scroll bar displayed in a user interface on the device. The second portion of the panoramic image can be determined based on the direction and amount of movement of the scroll bar. In further examples, the user input can include a text command that commands the second portion to be displayed, e.g., based on a magnitude (e.g., angle) parameter included in the text command. Other types of user input can be used to command the display of the panoramic image in the display view to change from the first portion to a determined second portion of the panoramic image.

In block 214, at least one audio segment is selected by the system from one or more audio segments associated with the second portion of the panoramic image. In some implementations, at least one audio segment is selected from multiple audio segments that are associated with the second portion of the panoramic image, e.g., selected from two or more associated audio segments. For example, each of the associated multiple audio segments can be a different audio segment and can have different conditions for triggering the audio segment for output, etc., allowing a different audio segment to be output in association with the second portion of the panoramic image based on different conditions or contexts, as described herein. Each audio segment can be a set (e.g., file or other collection) of audio data that causes audio to be output when played, and can be in any suitable format (lossy or lossless, MP3, FLAC, etc.). The selection of the at least one audio segment is based on one or more inputs or characteristics, including the received user input, characteristics of the panoramic image, characteristics of the user device, etc. In some implementations, the selection of the at least one audio segment is based on one or more attributes (e.g., parameters) associated with the one or more available audio segments and/or associated with the second portion of the panoramic image, such as attributes that specify trigger conditions. Some example implementations are described below with reference to FIG. 3.

In block 216, a change in the display of the panoramic image is caused, which includes transitioning the display from the first portion of the panoramic image to the second portion of the panoramic image. In some examples, the panoramic image is displayed being scrolled from the first portion to the second portion, e.g., displaying the pixels of the image moving across the display device in an animation. Some implementations can display the transition as the first portion directly changing to the second portion without showing intermediate scrolling or other movement of the image portions on the display device. In various implementations, the transition can be panning, tilting, or zooming, e.g., by displaying the movement from the first portion to the second portion in the display view, or by directly displaying the second portion in place of the first portion after the transition has occurred.

In block 218, the selected audio segment(s) that were selected in block 214 are output as audio by an output audio device in communication with the user device. For example, the data of selected audio segment(s) can be output as audio by one or more speaker devices connected to the user device (e.g., speakers, headphones, etc.). In some examples, the selected audio segment(s) can be output by a different audio device, e.g., remote speakers in communication with the user device. In some implementations, one or more of the selected audio segment(s) can be output based on the change in the display of the panoramic image in block 216. For example, the selected audio segment(s) can be output in coordination with the change in display of the image, e.g., at the same time that the display is changed, before the change is displayed, or after the change is displayed. In some examples, the output of the selected audio segment(s) is initiated at the start of the change in the image display. In some implementations, the selected audio segment(s) are output during a transition in display from the first portion to the second portion of the panoramic image (e.g., during a scrolling from the first portion to the second portion), and the output of the audio segment(s) is ceased when the transition is complete.

In some implementations, one or more of the selected audio segment(s) are displayed in response to the display of the second portion of the panoramic image. For example, a selected audio segment can be displayed after the second portion of the image is displayed.

In some implementations, if there are multiple selected audio segments, then the selected audio segments can be output at least partially at the same time, e.g., with the same starting times or different starting times. In some implementations, the selected audio segments can be output at different times. For example, the selected audio segments can be output in sequence, e.g., in a determined order. An output order, and/or a playback volume of each audio segment with respect to the other audio segments, can be determined based on one or more factors, including, for example, a priority level assigned to each of the audio segments (e.g., a priority value such that audio segments with higher priority values are played before audio segments with lower priority values). In some implementations, each audio segment can be associated with attributes, and some attributes of audio segments can be considered to have a higher priority based on the user's preferences or default settings (e.g., types and/or priorities can be associated with audio segments similarly to other attributes of audio segments). In some examples, audio segments associated with a type of "sound effect" or "speech" can have a higher priority than audio segments having a type of "music," as indicated by the user's preferences. In another example, if a change in the display to the second portion of the panoramic image is followed by a change in the display to a different portion of the image within a predetermined amount of time (e.g., a quick view of the second portion of the image followed by a view of a different portion of the image), and each of these image portions is associated with an audio segment to be output, a single one of these audio segments can be selected to be output based on priorities of the audio segments.

In some implementations, one or more of the audio segments can be output as stereo or three-dimensional sound provided within a simulated three-dimensional (3D) space associated with the panoramic image. For example, a spherical panoramic image can provide a simulated 3D space within its 360-degree view. Simulated audio speakers can be positioned at particular locations within the simulated 3D space such that audio is varied in output based on a view orientation of the display view, e.g., based on the locations of the audio speakers with respect to a displayed portion of the panoramic image. 3D sound effects associated with objects displayed in the panoramic image can be output based on the position of the objects with respect to the current view of the panoramic image.

In some implementations, a user can specify to share the panoramic image so that multiple user-authorized users (and user devices) can access the panoramic image and the associated audio segments. For example, commands to share the panoramic image can be received during display of the panoramic image as described for FIG. 2, and/or can be received during creation or editing of the panoramic image and/or audio segments for the panoramic image (an example of which is described below for FIGS. 4 and 6). If the user permits, shared users can modify an existing panoramic image. For example, a shared user can be allowed to assign an audio segment to a particular portion of the panoramic image. In some implementations, a shared user can be allowed to modify or update a panoramic image, e.g., modify audio segments and/or attributes of audio segments associated with the shared panoramic image. In some implementations, a priority determination can be made as to which audio segment(s) are output when triggered, based on the particular user who contributed that audio segment to the panoramic image.

In some implementations, one or more other panoramic images with audio segments as described herein can be accessible to the device if the user or device has been provided access rights, e.g., by the owning user(s) of the other panoramic images. The other panoramic images may have been created by other users, in some implementations. In some examples, the other panoramic images can be shared images stored on servers, other devices or storage connected to the network, etc. In some implementations, if user consent has been obtained from the users associated with the images, the device can search accessible panoramic images for image content, audio segments, and/or attributes that are same or similar to the content or attributes of the panoramic image displayed by the device.

Some implementations of devices outputting panoramic images and audio segments as described herein can include additional features. For example, in some implementations, a still image, video clip, or other image portion can be moved across the surface of the panoramic image independently of the movement (e.g., scrolling) of the view. For example, while displaying a portion of the panoramic image, a video clip can be animated so as to move across the display view, in or out of the display view, and/or otherwise across the image. In this context, moving across the image surface can be in any direction, such as a horizontal direction, a vertical direction, or any other direction in the display area of the image.

Some implementations can display virtual 3D objects within the simulated 3D space of a panoramic image such as a spherical or cylindrical image. For example, in a spherical image, a 3D object can be displayed between the display viewpoint and the spherical surface. As the view orientation and view portion of the image changes, the 3D object can be adjusted in orientation and/or position in accordance with these changes. Such 3D objects can be independently added to or removed from the panoramic image. Such 3D objects can be treated as an image portion as in other implementations described herein, and can be associated with one or more particular audio segments. Some implementations can project image content of the panoramic image onto a virtual surface of a displayed 3D object within the display view.

During display of the panoramic image for viewing by a device, some implementations can allow user input or preferences to select a particular audio segment for output from a group of multiple available audio segments associated with a given portion of a panoramic image. For example, a user can select one or more of the audio segments to be active and one or more of the audio segments to be inactive.

Some implementations can provide an option to record sound detectable by microphones of the device and store audio segments based on detected sound. For example, during display of the panoramic image by the device, a user can move the display view to display a particular portion of the panoramic image, and can select a control to start recording sound from a microphone of the device for a particular audio segment, and select a control to stop recording sound for that audio segment. The recorded audio segment can be associated with the displayed portion of the panoramic image (e.g., associated with a portion of the image having at least a portion of its display area at the center of the display view, or with a portion of the image occupying the greatest amount of display area with respect to the entire area of the display view).

In some implementations, a notification can be output on the device if the device (or other connected system) determines that same or similar audio segments as for the currently-output audio segment(s) have been associated with one or more portions of the panoramic image different than the display portion of the image. For example, an arrow or line pathway can be displayed in the display view to indicate the orientation or portion of the panoramic image at which the similar audio segment(s) are located and/or guide the view to that similar audio content.

Figure 3:
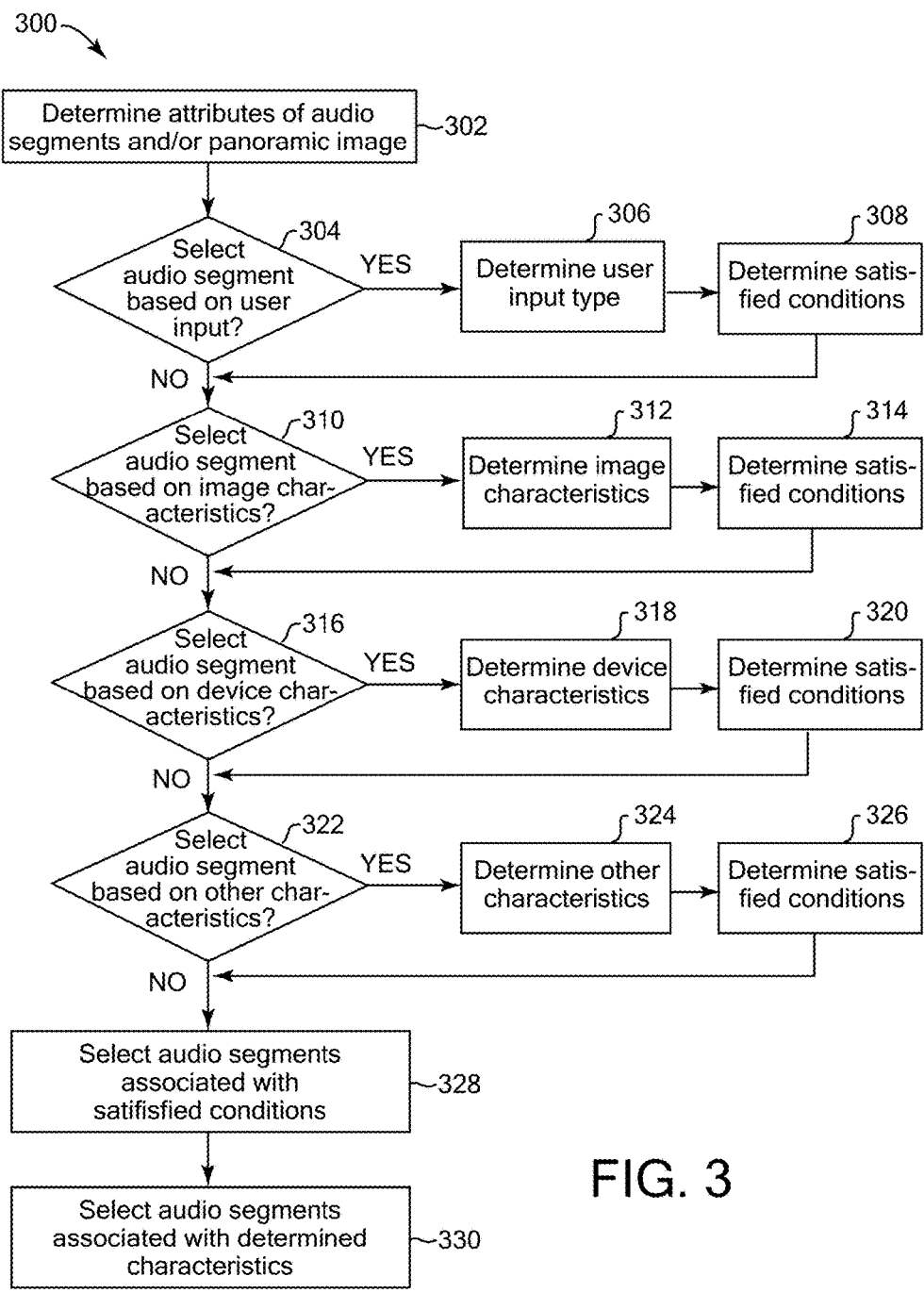
FIG. 3 is a flow diagram illustrating an example method in which at least one audio segment is selected from one or more audio segments that are associated with the second portion of the panoramic image, according to some implementations.

FIG. 3 is a flow diagram illustrating one example method 300 in which at least one audio segment is selected from one or more audio segments that are associated with the second portion of the panoramic image. For example, method 300 may be used to implement block 214 of the example method 200 of FIG. 2. In some implementations, method 300 can be performed for a panoramic image that is being displayed by a device as described in FIG. 2.

In block 302, one or more attributes of the audio segment(s) that are associated with the second portion of the panoramic image, and/or one or more attributes that are associated with the second portion of the panoramic image, are determined. In some implementations, the second portion of the panoramic image is associated with a set of multiple particular audio segments (e.g., and one or more other portions of the panoramic image are associated with different sets of multiple particular audio segments). Attributes can be embedded in an audio segment or can be associated with an audio segment, e.g., stored in a table or other data structure.

The attributes of a stored audio segment can indicate a variety of characteristics of the audio segment. For example, attributes can indicate one or more trigger conditions that, if the conditions are met, cause that audio segment to be selected and output. The system can read such attributes to assist in the selection of one or more selected audio segments. In some examples, a trigger condition can be based on user input (e.g., received in block 210). For example, the trigger condition can be triggered based on a particular type of user input being received while the panoramic image is being displayed and viewed, where the type of user input type is specified in the attribute. The trigger condition can specify that the type of user input also has one or more specified directions, speeds, magnitudes, etc. for the condition to be satisfied. In some implementations, an audio segment can include a combination of two or more specified trigger conditions, e.g., all of which are satisfied to trigger the selection and output of the associated audio segment.

In some examples, user input may cause a change in the display view from the first portion to the second portion of the panoramic image, and a trigger condition can be triggered (satisfied) by the change in the display. In some implementations, a trigger condition attribute can further indicate whether the audio segment is to be displayed during the change or after the change is completed. For example, a first audio segment can have (e.g. be associated with) a first attribute that indicates it is to be output during the change of display, and a second audio segment can have (e.g., be associated with) a second attribute that indicates it is to be output after the change to the display of the second portion, e.g., after a scroll, pan, or zoom to the second portion has been completed.

In another example, a trigger condition attribute can indicate to select and output the associated audio segment based on particular or type(s) of image characteristics of the second portion of the panoramic image being present (e.g., a type of feature detected in the second portion of the image, a color, brightness, or other visual characteristic, etc.). In another example, an attribute can indicate to select and output the associated audio segment based on one or more device characteristics (e.g., an orientation of the device, etc.). In another example, an attribute can indicate to select the associated audio segment based on one or more other characteristics, e.g., environmental characteristics including a geographic location of the device, detected ambient sound at the time that the user input was received or at the time the display is to be changed, etc. Some examples of trigger conditions are described below.

Some attributes can specify one or more categories and/or types for the associated audio segment. In some examples, audio segments can have an audio segment category or type of "sound effect," "speech," "music," etc., or narrower categories such as "outdoors" (for audio typically heard outdoors), "indoors," "animal sounds," "vehicle sounds," etc. Some attributes of an audio segment can specify output characteristics of the audio segment, e.g., audio volume, length of playback, speed of playback, etc. Some attributes can specify an identification of one or more other audio segments that are to be output after or at least partially at the same time as the associated audio segment. The identification can act as a link to the other audio segment(s), e.g., where the other audio segment(s) are output at a time specified in the attribute for the associated audio segment (e.g., 30 seconds after the start of output of the associated audio segment, immediately after the associated audio segment, etc.).

Some attributes of an associated audio segment can include a designation of a particular channel or direction in a surround sound configuration from which the audio segment is to be output relative to the user. For example, a left channel attribute can be specified for an audio segment designated to be output from a left audio output device (e.g., speaker) that is closer to a user's left ear than other speakers used by the device. In some examples, the audio segment can be output by the left channel under particular conditions as indicated in a trigger condition, e.g., when the display view is moved in a right direction across the panoramic image area. Similarly, a right channel can be designated for output from a right speaker closer to the user's right ear, or other channels output by other speakers if such speakers are available for output from the device (e.g., rear speaker, center speaker, front-right speaker, etc.). In some implementations, a surround sound environment can be created by having different audio segments output from different directional speakers in communication with the device.

In some implementations, an attribute of an audio segment can include a particular angular or spatial distance to cause output of the audio segment when the display view is displaying a different portion of the panoramic image that is spaced from the associated image portion by the angular or spatial distance. In some examples, an audio segment associated with a first image portion has an attribute specifying 180 degrees, and thus is to be output when the display view is displaying a different image portion that is 180 degrees away from the first image portion (e.g., on the opposite side of a spherical display area for a spherical panoramic image). Such attributes can allow an audio segment to be output while its associated image portion is not displayed in the display view.

In some implementations, one or more attributes can be associated with the second portion of the image (e.g., image attributes), which can indicate various characteristics of the second portion. For example, an attribute can indicate (e.g., with a label, tag, flag, or value) that the second portion depicts a particular type of image content feature (e.g., a person, animal, landscape feature, inanimate object, etc.). In some implementations, an attribute can indicate that the second portion depicts an image content feature that has been associated with a particular type of sound, e.g., a loud sound (e.g., a knock, bell, or gunshot), a quiet sound (e.g., a drip of water, a footstep), a background sound (e.g., sound of water flowing, wind in trees, city background noise, etc.), or other defined type of sound.

In some implementations, the second portion of the image can have attributes specifying one or more trigger conditions, which indicate the conditions under which associated audio segments are selected for output similarly as described above. For example, such trigger conditions can be specified using attributes of the second portion of the image instead of or in addition to trigger conditions specified in audio segment attributes. Some implementations can provide overall attributes for the entire panoramic image. In some examples, a trigger condition of a second portion is satisfied if one or more detected characteristics of the image, device, user input, etc., are associated with one or more audio segment attributes, such as audio segment categories or types. This can be determined, e.g., by consulting a number of stored, predefined associations between particular image content categories and particular audio segment categories.

In some implementations, a user's preferences can also be determined. For example, a user may have input particular preferences related to the selection of audio segments, including priority levels of types of audio segments (e.g., audio segments selected based on user input have a higher priority level than those selected based on device characteristics, a "sound effect" type of audio segment prioritized over a "music" type, etc.), minimum or maximum numbers of selected audio segments to be output, conditions under which audio is to be suppressed such that no audio segments are selected, etc. Such preferences can be used to assist in the selection of one or more selected audio segments as described below.

In block 304, it is checked whether one or more audio segments of the associated audio segments are to be selected based on user input (e.g., user input received in block 210 described above). In some implementations, one or more audio segments are, as a default, selected in block 304 based on user input. In some implementations, one or more audio segments are selected based on one or more trigger conditions, e.g., indicated by particular attributes as described above. In some examples, a trigger condition attribute of an audio segment specifies a particular type of user input that, if such user input has been received in block 210, cause selection and output of the associated audio segment.

In additional examples, the second portion of the image can also or alternatively have associated image attributes specifying one or more trigger conditions satisfied by user input type(s) and particular audio segment attributes. For example, if the received user input type is determined to have a predefined association or relationship with a category attribute of an audio segment, that audio segment is selected for output.

If none of the audio segments are to be selected based on user input, the method continues to block 310, described below. If one or more audio segments are to be selected based on user input, the method continues to block 306.

In block 306, one or more types of the user input (e.g., received in block 210) are determined. In some implementations, multiple predetermined types of user input can be defined, e.g., in stored conditions, criteria, and other data, and the received user input can be compared to the stored conditions or criteria, or otherwise processed to determine its type(s). For example, in some implementations, user input types can be organized into different types of commands. In some examples, the user input types can include a pan command (e.g., left or right scrolling of the view of the image), a tilt command (e.g., up or down scrolling of the view of the image), a scroll command (e.g., scrolling of the view of the image in any direction), a zoom command (e.g., zooming of the view on the image, in or out), or a zoom-in or zoom-out command.

User input types can also be organized into different directions. For example, a particular scroll direction can be determined, such as left, right, up, down, combinations of these, or a particular angular direction. In some implementations, a scroll direction can be specified as toward the second portion of the image, or away from the second portion of the image. A pan direction can be specified as left or right, a tilt direction as up or down, and a zoom direction as in or out.

User input types can also be organized into different rates (e.g., speeds), e.g., scrolling rates, panning rates, tilting rates, and zooming rates. The rates indicate the amount of change occurring in a particular time unit, such as the amount of pixels changed in the display view when moving from the first portion to the second portion of the image, divided by the time in which the change occurred. In some implementations, different ranges of rates is defined for a user type. For example, a "fast" scrolling rate can be predefined as a particular range of rates of scrolling, and a "slow" scrolling rate can be predefined as a lower range of rates of scrolling.

In some implementations, user input types can be distinguished based on the particular type of input device used to provide the user input. For example, user input provided from a touchscreen, such as a swipe across or a tap on the screen, can be considered one type. User input provided from other types of devices, e.g., mouse or other pointing device, joystick, trackball, trackpad, etc., can be considered other types. User input provided as a voice command (e.g., detected by microphone(s) of the user device) can be considered another type.

In some implementations, different forms of input from a particular input device can be considered different types of user input. For example, in some implementations, user input types can include one or more gestures input by the user by a particular input device. For example, touch gestures performed by a finger on a touchscreen, touchpad, or other sensing surface can include one or more types including a particular number of taps, a swipe (sliding a finger on surface in a particular direction and having a particular speed), a circle traced by a finger, a spiral, other shape, a character (e.g., numeral or letter), or other gestures can be detected. In some implementations, multiple different forms of gestures can be organized into a single particular gesture type. For example, a swipe, a tap, a double tap, and a circular gesture on a touchscreen can all be considered different types of user input. In some example implementations, a swipe of the user's finger to cause panning of the view of the panoramic image can be considered one type of user input, and a double tap of the user's finger to cause a direct change in the display view of the panoramic image can be considered a second type of user input. In some examples, each of these user input types can be associated with a different audio segment that is associated with the second portion of the panoramic image.

In block 308, any trigger conditions that have been satisfied by the user input types of block 306 are determined. For example, if the user input is fast scrolling, then trigger conditions satisfied by this type of user input are determined, e.g., trigger conditions of audio segments and/or trigger conditions of the second portion of the panoramic image. In some examples, a trigger condition of an audio segment can check whether a particular user input type has been received. A trigger condition of the second portion can check whether the user input type is associated with or related to one or more attributes of the associated audio segments, such as audio segment categories or types.

After the satisfied conditions are determined in block 308, the method continues to block 310, or in some implementations, the method can continue to block 328, described below.

If, in block 304, none of the audio segments are to be selected based on user input, or after the satisfied conditions are determined in block 306, the method continues to block 310. In block 310, it is checked whether one or more of the audio segments are selected based on image characteristics, e.g., characteristics of pixels or pixel areas of the image. For example, audio segments may have stored attributes that are trigger conditions satisfied by particular image characteristics. For example, in some implementations, such a trigger condition can be indicated by a particular attribute as described above. In some examples, a trigger condition attribute of an audio segment indicates one or more particular image characteristics that, if detected in the second portion, cause selection and output of the associated audio segment.

In additional examples, the second portion of the image can also or alternatively have associated image attributes specifying one or more trigger conditions satisfied by image characteristics and particular audio segment attributes. For example, if a detected image characteristic is determined to have a predefined association or relationship with a category attribute of an audio segment, that audio segment is selected for output.

If none of the audio segments are to be selected based on image characteristics, the method continues to block 316, described below. If one or more audio segments are to be selected based on image characteristics, the method continues to block 312.

In block 312, one or more image characteristics are determined. In some implementations, multiple predetermined types of image characteristics can be defined, e.g., in stored data, and these predefined types of image characteristics can be determined from the panoramic image. In some implementations, the image characteristics are determined from the second portion of the panoramic image. For example, the image characteristics can include visual image characteristics including one or more of brightness, colors, textures or patterns, noise level, exposure level, blurriness/sharpness, contrast, or other visual characteristics of pixels or areas in the second portion of the image. In some implementations, the magnitude or strength of the image characteristics can be determined and stored. Some implementations can detect edges in the image, e.g., using edge detection techniques.

In some implementations, if user consent has been obtained from the user(s) owning and/or providing the image and depicted in the image, the determined image characteristics can include image content features that are detected in the panoramic image, e.g., in the second portion of the panoramic image. For example, image content features can include faces (without determining identity of the persons), animals, landscape features (mountain, sky, foliage, buildings, sunset, etc.), monuments, objects (e.g., articles), etc. One or more image detection or recognition techniques can be used to detect and/or recognize such image features, e.g., based on machine learning based on training images, comparisons to model or template images and features, comparisons to predetermined characteristics (colors, shapes defined by edges formed by pixel colors, etc.), etc.

In some implementations, different types of image content features can be categorized into various image content categories, e.g., "faces," "landscapes," "animals," etc., and the categories for detected image content features are determined. For example, these categories can be determined for detected image content features based on stored predefined associations, look-up tables, or other reference data (e.g., stored locally to the device or on an accessible network server), where one or more descriptive labels that are determined for a detected feature can be compared to the predefined associations or other data. Some image content features can be categorized into other topics or concepts, e.g., daytime, nighttime, weather type (e.g., sunny, snowy, rainy, etc.), indoor, outdoor, fast, slow, happy, sad, etc., which can be based on the image content features depicted in the image (e.g., detected labels for faces, weather, lighting, objects, etc.).

For example, in some implementations, image content features and/or image content categories can be detected in the second portion of the panoramic image, and these image content features and/or categories are used to satisfy one or more trigger conditions to cause selection and output of one or more of the associated audio segments. For example, an image content category of "landscape" is determined for image content features of a sky and mountain detected in the second portion of the panoramic image. Multiple audio segments are associated with the second portion, and one of these audio segments provides a sound of wind and has a trigger condition triggered by the "landscape" category, thus causing this audio segment to be selected for output in this example.

In some implementations, image content features and/or categories can be detected in the first portion of the panoramic image, and these image features and/or categories are used to satisfy one or more trigger conditions to cause selection and output of one or more of the associated audio segments. In some implementations, image content features and/or categories can be detected in the first portion, second portion, and/or other portions of the panoramic image, and these image content features and/or categories are used to satisfy one or more trigger conditions to cause selection and output of one or more of the associated audio segments.

In block 314, any trigger conditions that have been satisfied by the image characteristics of block 306 are determined. For example, if a determined image characteristic is a detected image content feature of a sunset, then trigger conditions satisfied by sunset image features are determined, e.g., trigger conditions of audio segments and/or trigger conditions of the second portion. In some examples, a trigger condition of an audio segment can be satisfied when a particular image content characteristic or category has been detected in the second portion of the panoramic image.

A trigger condition of the second portion can be satisfied if one or more detected image content characteristics or categories of the second portion are associated with or related to one or more attributes of the associated audio segments, such as audio segment categories or types. In some examples, a trigger condition of the second portion checks whether one or more detected image content categories of the second portion are associated with one or more audio segment attributes, such as audio segment categories or types, e.g., by consulting a number of stored, predefined associations between particular image content categories and particular audio segment categories. Using the stored associations, one or more detected image content categories of the second portion are determined in block 314 to be associated with one or more audio categories of one or more audio segments of the second portion, thus satisfying the trigger condition. In an example, a particular one of the multiple audio segments associated with the second portion has an audio segment category of "outdoors" as determined by checking audio segment attributes. An image content category of "landscape" is detected in the second portion and, by consulting stored predefined associations, is determined to be associated with the audio category of "outdoors." Thus, the particular audio segment satisfies the trigger condition and is selected, while other audio segments of the second portion do not satisfy the trigger condition.

After the satisfied conditions are determined in block 314, the method continues to block 316, or in some implementations, the method can continue to block 328, described below.

If, in block 310, none of the audio segments are to be selected based on image characteristics, or after the satisfied conditions are determined in block 314, the method continues to block 316. In block 316, it is checked whether one or more audio segments are to be selected based on one or more device characteristics. For example, in some implementations, such a trigger condition can be indicated by a particular attribute of an audio segment as described above. In some examples, a trigger condition attribute indicates one or more particular device characteristics that, if present, trigger selection and output of the associated audio segment. In additional examples, the second portion of the image can also or alternatively have associated image attributes specifying one or more trigger conditions satisfied by device characteristics and particular audio segment attributes. For example, such a trigger condition can specify that, if a detected device characteristic is determined to have a predefined association or relationship with a category attribute of an audio segment, that audio segment is selected for output.

If none of the audio segments are to be selected based on device characteristics, the method continues to block 322, described below. If one or more audio segments are to be selected based on device characteristics, the method continues to block 318.

In block 318, one or more device characteristics of the user device are determined. The device characteristics are predefined characteristics of the device. In some implementations, multiple predetermined types of device characteristics can be defined, e.g., in stored data, and these predefined types of device characteristics can be determined from the user device in its current state.

For example, in some implementations, the device characteristics can include the current orientation of the device in space, or an orientation of the device after the user input was received. For example, the orientation can be determined based on device sensors such as one or more gyroscopes and/or accelerometers. In some implementations, the device characteristics can include a motion of the user device, e.g., tracked over a particular period of time. For example, a motion gesture can be detected, which can be a particular path or pattern of motion of the device. For example, a shaking gesture can be detected as a particular frequency of shaking of the device, a particular amount of motion in space, etc. Some implementations can infer a pose of a user of the device by detecting the orientation and motion of the user device.

In some implementations, the device characteristics can include capabilities of the device, e.g., processing capability and/or available processing resources of one or more processors of the user device, memory capability and/or currently-available memory capacity of the user device, display device characteristics (e.g., display screen size and pixel resolution, display processor capability, etc.), audio output device characteristics (e.g., size, physical spacing, and/or number of audio speakers), sensing capability (e.g., types and/or number of sensors including Global Positioning System (GPS) sensors, gyroscopes and accelerometers, temperature sensors, etc.), network communication capability (e.g., available bandwidth, amount of data that can be downloaded or uploaded, connected network capabilities, etc.), and so on.

In some examples, if user consent has been obtained, the device characteristics can include states or statuses of applications or other programs running on the user device. For example, messages or notifications received or provided by the user device or a running communications application of the user device can be device characteristics. In some examples, the messages or notifications are received from a server or one or more other user devices over a communication network. For example, messages can be provided by other users from their user devices or news/information network services. Notifications can indicate an event that has occurred on the user device (e.g., reception of a message, a calendar event or reminder occurring, a battery low-power notification, a particular state or achievement in a game program running or being played on the user device, etc.).

In block 320, any trigger conditions that have been satisfied by the device characteristics of block 318 are determined. In some examples, a trigger condition of an audio segment can be satisfied if a particular device characteristic or category has been detected. A trigger condition of the second portion of the image can be satisfied if one or more detected device characteristics or categories are associated with or related to one or more attributes of the associated audio segments, such as audio segment categories or types. For example, a particular trigger condition may be satisfied by a device characteristic that is a particular orientation or shaking gesture of the device. Some trigger conditions can be satisfied by a particular notification from a particular type of application program (e.g., calendar application), or satisfied by a message from a particular user (allowed if user consent has been obtained). In some implementations, a trigger condition can require that a device characteristic occur within a particular period of time relative to (e.g. prior to and including) a current time. For example, if the detected device characteristics include a message received from a particular user within the last 3 minutes, then the trigger conditions are determined which are satisfied by a received message within that time period.

After satisfied conditions are determined in block 320, the method continues to block 322, or in some implementations, the method can continue to block 328, described below.

If, in block 316, none of the audio segments are to be selected based on device characteristics, or after the satisfied conditions are determined in block 320, the method continues to block 322. In block 322, it is checked whether one or more audio segments are to be selected based on one or more other characteristics related to the user device. Some examples of other characteristics are described below. For example, in some implementations, such a trigger condition can be indicated by a particular attribute of an audio segment as described above. In some examples, a trigger condition attribute indicates one or more particular other characteristics that, if present, trigger selection and output of the associated audio segment. In additional examples, the second portion of the image can also or alternatively have associated image attributes specifying one or more trigger conditions satisfied by other characteristics and particular audio segment attributes. For example, such a trigger condition can specify that, if a detected characteristic is determined to have a predefined association or relationship with a category attribute of an audio segment, that audio segment is selected for output.

If none of the audio segments are to be selected based on other characteristics, the method continues to block 328, described below. If one or more audio segments are to be selected based on other characteristics, the method continues to block 324.

In block 324, one or more other characteristics of the user device are determined. The other characteristics are relevant to trigger conditions. In some implementations, multiple predetermined types of other characteristics can be defined, e.g., in stored data, and these predefined types of other characteristics can be determined from the user device, user, or other sources.

For example, in some implementations, if user consent has been obtained from the user, the other characteristics can include one or more characteristics of the user, e.g., user contacts, social groups of which the user in a member (e.g., of a social networking service or other network service), etc.

In some implementations, the one or more other characteristics can include current environmental characteristics in the current environment of the device, e.g., a current context of the user and/or user device. For example, the other characteristics can include a current time and/or date. In some examples, it can be determined whether the current time or day occurs on a holiday or other popular observed event, as determined by a stored calendar and related information describing holidays and events.

In some implementations, if user consent has been obtained, environmental characteristics can include a geographic location at which the user device is currently located (or at which the user device was previously located, e.g., within a predefined time period prior to the current time). The geographic location can be determined based on one or more sensors of the device, e.g., Global Positioning System (GPS) sensors. In some implementations, geographic coordinates can be determined, and/or labels or names describing one or more regional characteristics of the current geographic location (e.g., name of city, park, county, state, or other region). For example, map data can be referenced, e.g., stored locally or accessible remotely over a communication network, to determine geographic names. Elevation or altitude of the device can also be determined, e.g., using GPS sensors or other device sensors.

In additional examples, the one or more other characteristics can include environmental characteristics such as ambient light surrounding the user device, e.g., indicating whether surroundings are day or night, indoors or outdoors, etc. In some implementations, one or more light sensors or cameras of the user device can be used to detect ambient lighting. Some implementations can use device sensors or cameras to determined whether the user device is currently indoors or outdoors, e.g., based on current color and/or strength of lighting. In additional examples, the one or more environmental characteristics can include ambient detected audio detected by the device, e.g., noise or sounds that are present in the environment of the user device (e.g., traffic sounds, audience clapping sounds, bird sounds, water sounds, rain sounds, etc.). In some implementations, sounds such as speech from persons can be excluded, e.g., and background sounds can be detected. For example, the noise or volume level of the ambient audio can be determined in some implementations, and/or the type of ambient sound can be detected and recognized, if user consent has been obtained, e.g., using one or more audio recognition techniques. For example, sound types such as flowing water, birds, traffic, human voices, etc. can be detected based on such techniques, e.g., by comparing a detected sound to stored model sounds, and/or using machine learning techniques that use training based on particular types of sounds.

In block 326, any trigger conditions (and associated audio segments) that have been satisfied by the other characteristics of block 324 are determined. In some examples, a trigger condition of an audio segment can be satisfied if a particular characteristic has been detected. A trigger condition of the second portion of the image can be satisfied if one or more detected characteristics are associated with or related to one or more attributes of the associated audio segments, such as audio segment categories or types. In some examples, a particular trigger condition satisfied by a time condition may be specified as a time range or date range and is satisfied by a particular current time. Similarly, a trigger condition can be specified as a geographic range and is satisfied by a current geographic location of the device.

If, in block 322, none of the audio segments are to be selected based on other characteristics, or after the satisfied conditions are determined in block 326, the method continues to block 328.

In block 328, one or more audio segments are selected which are associated with trigger conditions that have been satisfied, e.g., by the determined characteristics and/or user input types as determined in one or more blocks of method 300. Furthermore, it can be checked whether the selected audio segments conform to the user's preferences. For example, if an audio segment having a trigger condition is satisfied by a particular user input type determined in block 306, then that audio segment is selected. Similarly, if a particular image, device, or other characteristic is determined in one or more of blocks 312, 318, and 324, then audio segment(s) that are associated with the determined characteristic(s) are selected. In additional examples, if a trigger condition of the second portion of the image is satisfied, then qualifying audio segments are selected.

In some examples, the second portion of the image is associated with two (or more) audio segments, including a first audio segment associated with a first trigger condition, and a second audio segment associated with a second trigger condition. The first trigger condition is different than the second trigger condition. In one example, in some implementations, the first trigger condition is satisfied with one type of user input, and the second trigger condition is satisfied with a different type of user input, and the first audio segment or the second audio segment can be selected in block 328 based on whether the first trigger condition is satisfied or whether the second trigger condition is satisfied, respectively. Additional audio segments can be similarly associated with the second image portion such that a third audio segment can be triggered if a third trigger condition is satisfied, and so on. In some implementations, multiple trigger conditions may be specified such that they can all be satisfied in some cases, which would cause all the associated audio segments to be selected. Some implementations can specify one or more of the associated audio segments to always be triggered and selected (e.g., output in a loop). For example, a particular trigger condition can be specified that is always considered satisfied.

If the user's preferences indicate that a certain type of characteristic is not to be used to select an audio segment, then that type of characteristic is ignored for the audio segment selection. If the user's preferences indicate that a maximum number of audio segments are to be selected for a portion of the panoramic image, then the maximum number of the qualifying audio segments can be selected. For example, audio segments having a higher priority level and/or having a greater number of trigger conditions satisfied can be selected.

In block 330, in some implementations, multiple selected audio segments can be mixed together, if applicable. For example, if two audio segments are selected for output in block 328, these audio segments can be combined such that they are both output. In some implementations, one or more of the audio segments can be associated with priorities (e.g., priority levels or values), and the audio segments having higher priority can be designated to have a louder volume with respect to the volume of other, lower-priority audio segments in a combination.

Some implementations may select a default audio segment or a subset of multiple audio segments for output, where the multiple audio segments are associated with a portion of the image (e.g., the second portion of the image in the method examples as described above). For example, there may be a maximum number of audio segments that are allowed to be output based on default settings and/or user preferences. In some implementations, a particular audio segment (or a subset of the associated audio segments) can be designated as a default audio segment for the associated image portion. For example, the default audio segment can be a highest priority audio segment as described herein, e.g., as indicated by an authoring user, user preferences, etc. In some implementations, during display of the panoramic image, the method 300 can check whether the user device and/or viewing application that is displaying the panoramic image supports the selection of one or more audio segments based on trigger conditions (or other conditions) as described for method 300. If there is no such support, but the output of a single associated audio segment is supported, then the default audio segment can be selected for output. Similarly, if the output of a particular number of audio segments is supported, the highest priority audio segments can be selected. In some cases, the device or application may not support the output of any associated audio segments, such that no audio segments are selected.

In some examples, as described herein, multiple audio segments can be associated with a single portion of the panoramic image, such as the second portion, and different ones of these audio segments can be assigned one or more different trigger conditions and thus are selected and output under different conditions. For example, a first audio segment can be provided a trigger condition that is triggered by a first type of user input during display of the panoramic image (e.g., a faster scrolling, e.g., above a predetermined threshold speed, from any portion of the panoramic image to the selected second portion of the panoramic image), and a second audio segment can be provided a trigger condition that is triggered by a second type of user input during display (e.g., a slower scrolling, e.g., below the predetermined threshold speed, from any portion to the second portion of the panoramic image). In some examples, if during display the user performs the faster scroll to display a depiction of a lion in the selected portion of the image, a first audio segment is output that mimics the sound of a lion roaring loudly. If the user performs the slower scroll to display the lion, a second audio segment is output that mimics the sound of the lion growling more softly. In some implementations, only one of these audio segments is output based on the speed of the scrolling.

In another example, in some implementations, an audio segment can be designated via one or more trigger conditions to trigger based on a zooming speed of the display view when displaying a portion of the panoramic image. For example, the first portion of the image can be a zoomed-out view showing a greater area of the image, and the second portion of the image can be a zoomed-in view showing a smaller area shown in greater detail and included within the greater area of the image. The speed of the zooming can trigger a first audio segment if the speed is above a predetermined threshold, and can trigger a second audio segment if the speed is below the predetermined threshold.

In another example, a zoomed-out larger area of the panoramic image may be displayed in the display view. User input is received to change the display view to a smaller area within the larger area (e.g., zoom in), and a particular audio segment associated with the smaller area (e.g., associated with an image feature included in the smaller area) can be output. For example, a larger view of an entire scene of the panoramic image can be displayed as the larger area, where multiple image features are included in the scene. Each image feature can be associated with its own different audio segment. In some example implementations, if multiple image features of the scene are displayed in the display view and at least two of those image features are associated with different audio segments, then none of those audio segments are selected for output during display of the zoomed-out scene. If the display view is zoomed in to display only one of the image features, the audio segment associated with that image feature is triggered to be selected and output.

In another example, different audio segments associated with a portion of the panoramic image (e.g., the second portion) can have different attributes that specify different trigger conditions based on one or more image characteristics of the panoramic image. For example, the image characteristics can relate to the second portion of the image. In some examples, if the second portion of the image depicts a lion that is displayed in the display view, an associated audio segment outputs audio of a lion's roar. If the second portion of the image depicts a bell that is now displayed in the display view, an associated audio segment outputs audio of a bell ringing.

In another example, a trigger condition of an audio segment can be specified to trigger if an image content feature of the associated image portion (e.g., second portion) changes during its display. For example, if an image content feature is animated within the panoramic image (e.g., within a portion of the image that is displayed as a video, cinemagraph, or otherwise animated), an audio segment can be triggered based on this animation. For example, an animation of a bell moving can be associated with an audio segment outputting audio of the sound of a bell ringing. In other examples, a selected portion depicting a calm forest or calm ocean with slow or gentle motion can be associated with calm music, or a selected portion that includes a video depicting fast motion can be associated with an energetic music with fast beat, etc. Different audio segments can be associated with different types of animations of the same image content feature. For example, an animation of a person walking can be associated with an audio segment outputting audio of footsteps, and an animation of that same person laughing can be associated with an audio segment outputting audio of laughter.

In another example, an audio segment can be designated via one or more attributes to trigger based on the image characteristics of the first portion the panoramic image that was displayed in the display view prior to displaying the second portion of the image. The trigger condition can be based on image characteristics of the first portion of the image, and/or based on both the first and second portions of the image. For example, an attribute can specify that if, during display of the panoramic image, the display view changes from a particular first portion (or the first portion can be any portion of the image different than the second portion) to the second portion, a particular audio segment is output. This particular audio segment can be associated with the second portion of the image, and/or can be associated with the first portion of the image. In some examples, an audio segment can be specified to trigger if the first portion of the image depicts a first vehicle and the second portion of the image depicts a second vehicle, where the audio segment outputs audio of a car horn honking.

Figure 4:
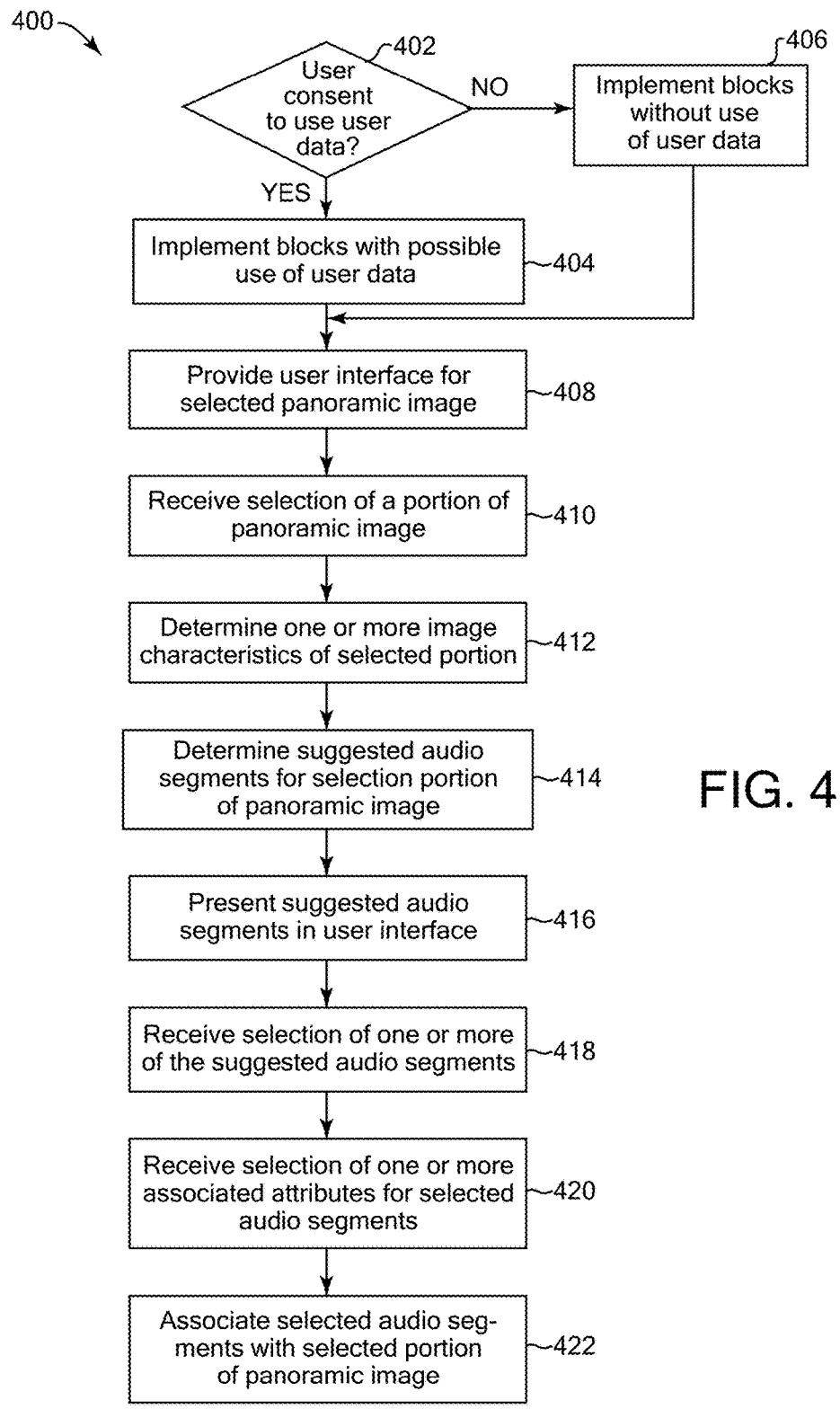
FIG. 4 is a flow diagram illustrating an example method to associate audio segments with a portion of a panoramic image, according to some implementations.

FIG. 4 is a flow diagram illustrating an example method 400 to associate audio segments with a portion of a panoramic image. In some examples, method 400 can be used to determine audio segments and attributes for the second portion and/or the first portion of the panoramic image described with respect to FIGS. 2 and 3.

In some implementations, method 400 can be implemented, for example, on a server system 102 as shown in FIG. 1. In some implementations, some or all of the method 400 can be implemented on a system such as one or more client devices 120, 122, 124, or 126 as shown in FIG. 1, and/or on both a server system and one or more client systems. In described examples, the implementing system includes one or more processors or processing circuitry, and one or more storage devices such as a database 106 or other accessible storage. In some implementations, different components of one or more servers and/or clients can perform different blocks or other parts of the method 400.

In block 402, it is checked whether user consent (e.g., user permission) has been obtained to use user data in the implementation of method 400. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 400, then in block 404, it is determined that the blocks of the methods herein can be implemented with possible use of user data as described for those blocks, and the method continues to block 408. If user consent has not been obtained, it is determined in block 406 that blocks are to be implemented without use of user data, and the method continues to block 408. In some implementations, if user consent has not been obtained, blocks are to be implemented without use of user data and with generic or publicly-usable data.

In block 408, a user interface is provided for a selected panoramic image. In some implementations, the user interface displays at least a portion of the panoramic image. In some examples, the user interface is displayed on a display device of a client device or server device. A user of the user interface can select the panoramic image and/or cause the panoramic image to be displayed in the user interface by selecting the panoramic image from available images, e.g., images accessible by the user and stored on one or more accessible storage devices. In some implementations, a portion of the panoramic image can be displayed in a view of the user interface. Some implementations can display the entire panoramic image, e.g., including distortion if displayed as a projection of the panoramic image. For example, a spherical panoramic image can be displayed in a rectangular form that includes distortion.

In block 410, a selection is received of a portion (e.g., area) of the panoramic image displayed in the user interface. For example, the user may input or define the selection of the image portion. In some examples, the image portion can be selected using one or more tools of the user interface. For example, one or more commands received from the user (e.g., input using controls of the user interface or input provided to an input device such as a touchscreen) can cause a display view to be scrolled over different portions of the panoramic image, and any portion displayed in the display view can be selected based on a received command from the user. In another example, received user input from the user can cause an outline to be displayed over a displayed portion of the panoramic image, and the portion of the panoramic image that is within the outline can be the selected portion of the panoramic image. Some example implementations can provide one or more drawing functions (e.g., drawing tools) to allow user input to create an outline to select a portion of the panoramic image (e.g., allowing the user to draw outlines of particular shapes, a free-form drawing function, a function to automatically trace a detected object in the panoramic image, etc.). In some implementations, the user can select one or more pixels, and an image feature that includes the selected pixels can be detected in the panoramic image (e.g., using one or more image content feature recognition techniques as described above) and selected as the selected portion of the panoramic image. In some implementations, the selection of the portion of the panoramic image can be determined based on other user commands or other user input, e.g., voice commands, portions selected in previous processes, etc.

In block 412, one or more image characteristics are determined for the selected portion. For example, the determined image characteristics can include characteristics of pixels or pixel areas described above for blocks 312 of FIG. 3, including brightness, color, texture, blurriness, etc. If user consent has been obtained, the determined image characteristics can also include detected image content features that are depicted in the selected portion of the panoramic image. For example, one or more image recognition techniques can be used to detect types of image content features including faces, landscape features, objects, etc. These image content features can be categorized in some implementations, e.g., similarly as described above for FIG. 3.

In block 414, one or more suggested (e.g., candidate) audio segments are determined by the system for the selected portion of the panoramic image. The suggested audio segments can be selected from a set (e.g., a list or a collection) of available audio segments. In some implementations, the available audio segments in the set can be categorized into different categories and/or can be associated with different attributes. In some implementations, the system can use the image characteristics determined in block 412 for the selected portion of the image to select the suggested audio segments. For example, the system can match (e.g., match or approximate match) one or more determined image characteristics for the selected image portion to one or more attributes of the available audio segments. In some examples, if an image characteristic for the selected portion of the image is a detected feature of a sunset, the system can check for available audio segments that have an attribute (e.g., label or tag) that is "sunset" or which may be similar to "sunset" (e.g., evening, twilight, sunrise, etc., as indicated by accessible dictionaries, thesaurus, etc. and/or machine learning techniques to determine similar words, concepts, etc.).

Some implementations can select suggested audio segments based on additional or other criteria. For example, audio segments can be suggested by the system based on user preferences, other audio segments selected for other portions of the panoramic image (e.g., similar audio segments to the other portions), etc. In some implementations, if one or more audio segments have already been selected and associated with this portion of the image, audio segments can be suggested that do not have one or more of the attributes of the previously-selected audio segments (e.g., have a different trigger condition, etc.).

In block 416, the suggested audio segments are presented, e.g., displayed by a display device in the user interface and/or otherwise output by the user device. The suggested audio segments can be presented as suggested audio for the selected portion of the panoramic image. In some implementations, if the number of suggested audio segments is over a threshold amount, a subset of the suggested audio segments can be presented, where the remaining audio segments can be presented in response to user input (e.g., input causing a list to be scrolled to view additional suggested audio segments). Some implementations can rank the suggested audio segments and present the suggested audio segments having the highest ranks. For example, the suggested audio segments can be ranked based on the similarity of their attributes to the determined image characteristics of the selected portion of the image, where the greater the similarity, the higher is the assigned rank.

In block 418, selection of one or more of the suggested audio segments is received. For example, user input provided by the user can select the suggested audio segments. In some examples, suggested audio segments displayed in the user interface are selected based on user input on a touchscreen, user input from a pointing device, user input based on voice or speech detected by microphone, etc. In some implementations, a user can select multiple audio segments to be associated with the selected portion of the panoramic image. For example, different audio segments can have different trigger conditions and thus be triggered based on different viewing conditions of the selected image portion.

In block 420, selection of one or more associated attributes is received, where the attributes define characteristics of the audio segment(s) selected in block 418. As described above with reference to FIG. 3, the attributes can include trigger conditions that indicate the viewing conditions of the image under which the associated audio segments will be selected and output as audio. In some cases or implementations, multiple audio segments can be associated with the selected portion of the panoramic image, and different ones of these audio segments can be assigned one or more different attributes, e.g., by the user. Different audio segments can be designated to be triggered based on different trigger conditions including different user input types, image characteristics, device characteristics, environmental conditions, etc. Other attributes can specify output characteristics, audio segment types, and/or other characteristics of an audio segment as described herein.

In some examples, these attributes can be similar to the attributes described above for block 302 of FIG. 3. For example, the attributes of an available audio segment can indicate one or more particular user input types, image characteristics, device characteristics, and/or other characteristics with which that audio segment is associated.

In block 422, the selected audio segment(s) are associated with the selected portion of the panoramic image. For example, a reference to a selected audio segment and its attributes can be stored in or with data describing the selected portion of the panoramic image, e.g., a reference that identifies the selected portion and/or a description of the selected portion (e.g., coordinates indicating its position within the panoramic image, data indicating the boundaries of the selected portion, etc.). The selected audio segment(s) can be stored with the panoramic image (e.g., in a data structure) in some implementations, or can be stored separately and linked or otherwise associated with the panoramic image.

Figure 5:
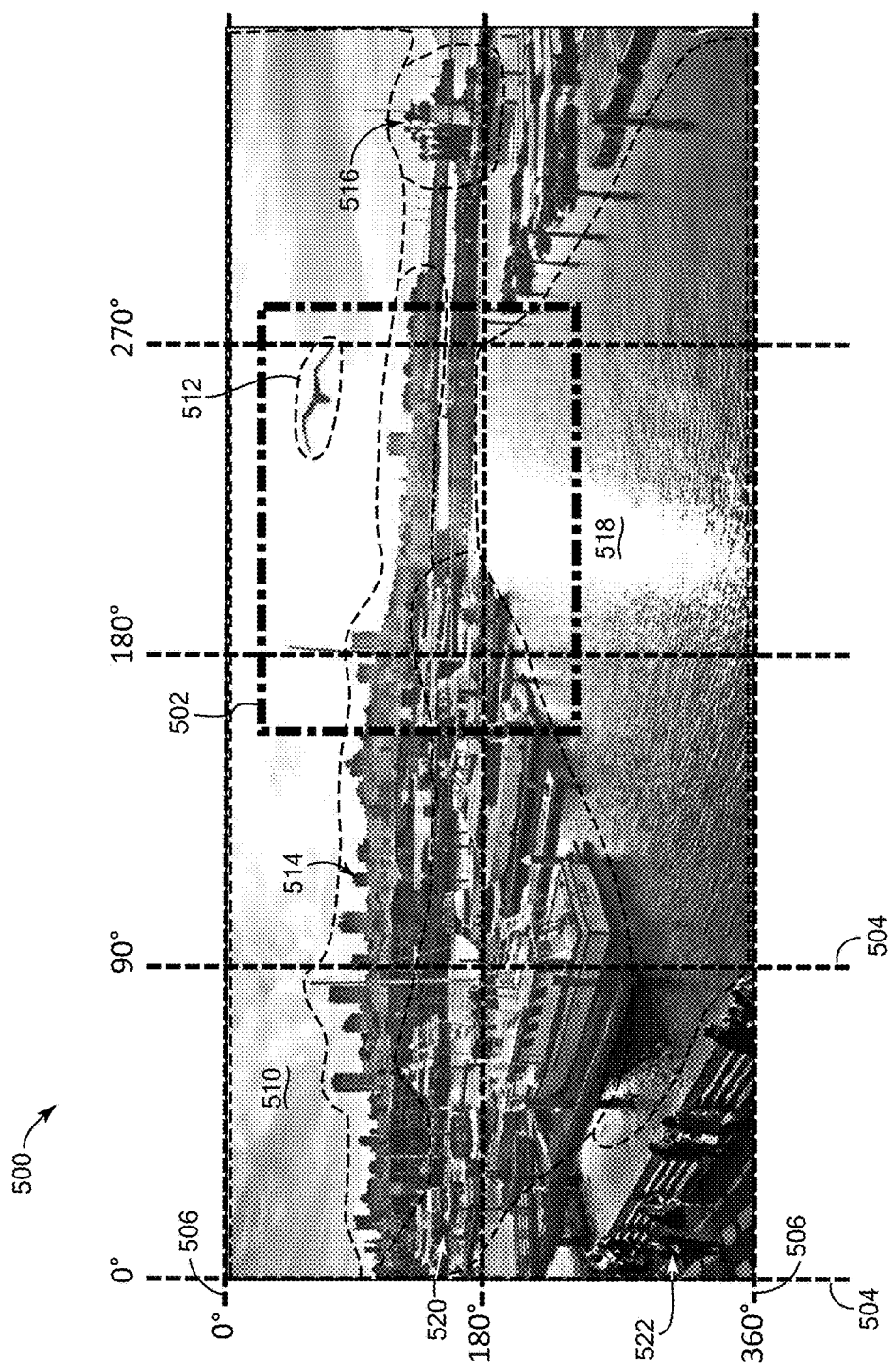
FIG. 5 is a diagrammatic illustration of an example panoramic image used with audio segments and other features described herein, according to some implementations.

FIG. 5 is a diagrammatic illustration of an example panoramic image used with audio segments and other features described herein. FIG. 5 shows an example panoramic image 500 that can be displayed as a spherical panoramic image on a display screen of a device. In the example of FIG. 5, panoramic image 500 is shown as a rectangle including its entire image content, e.g., showing the area that will cover a 360-degree spherical view when displayed as if projected on the inside surface of a sphere. For explanatory purposes, image 500 is not shown as an actual rectangular, two-dimensional form of a spherical image, e.g., an equirectangular projection image, which typically has a warped appearance for straight lines and other depicted features. Image 500 is shown as an approximation of how the image content may be displayed when viewing one portion of the panoramic image at a time, e.g., in a view on a display screen that is projecting the image spherically.

A portion of the panoramic image 500 can be displayed in a display view on a display of a device, e.g., a display screen. Display view 502, indicated by a dashed rectangle, can represent the extent of an example display view provided on a display screen, where the portion of the image 500 inside the display view 502 is displayed by the device. For example, the display view 502 can be displayed on a display screen of a mobile device, a display area of a virtual reality device, or on a display screen of other types of devices. In various implementations, the display view 502 can cover the entire display screen of the device, or can cover a portion of the display screen, e.g., in a window or other screen portion. The size of the portion of the image 500 that can be displayed in the display view 502 can vary depending on the size of the view, the size of the projected spherical surface (and thus simulated distance from the viewer), orientation of the viewing device, e.g., portrait or landscape, etc. For example, display view 502 can be smaller in other implementations, or larger, and can be of different shapes (circular, oval, triangular, polygonal, star-shaped, etc.).

In this example, dashed lines 504 and dashed lines 506 indicate angular positions in horizontal and vertical view movement dimensions, respectively, when viewing different portions of the image 500 by moving the display view 502. For example, a horizontal dimension reference angle of 0 degrees (indicated by a vertical dashed line 504) can indicate a reference angular position when horizontally scrolling (e.g., panning) the display view 502 through the image 500. As the user pans the view over the image to the right, other angular positions appear in the display view 502 of the display screen, including the 90 degree, 180 degree, and 270 degree positions, in that order. The image "wraps around" such that the display view 502 returns to the 0 degree position after panning to right of the right edge shown in FIG. 5. In some implementations, image 500 is a spherical image and is projected as if on a spherical surface, such that as the display view 502 is scrolled relative to the image 500, slight curvature or warping of the image content can be displayed within the display view 502 as if the content were projected onto a spherical surface.

Similarly, a vertical dimension reference angle of 0 degrees (indicated by a horizontal dashed line 506) can indicate a reference angular position when vertically scrolling the display view 502 through the image. As the user scrolls the display view 502 up or down over the image 500, other angular positions appear in the display view 502 of the display screen, including the 180 degree and higher degree positions. The image "wraps around" such that the display view 502 returns to the 0 degree position after tilting down past the bottom edge shown in FIG. 5, and wraps around in the opposite direction as well. In different implementations, the available angular positions may not be 360 degrees in either or both of the horizontal and vertical directions. For example, some panoramic images may include 360-degree content in a horizontal direction, with 180-degree content in the vertical direction. In another example, some panoramic images may be less than 360-degrees in the horizontal direction.

In some implementations, the display view 502 can be scrolled with respect to the image content of the panoramic image 500 based on an orientation associated with the display view 502. For example, the display view 502 can be displayed on a display screen of a mobile device, so that the orientation of the view is the orientation of the mobile device in space. In some examples, the user tilts or rotates the mobile device and the display screen to change the orientation of the view, which causes movement (e.g., scrolling) of the display view 502 to different portions of the image 500. For example, in some implementations, horizontal rotation (e.g., around a vertical axis) or horizontal panning of the device can cause corresponding horizontal scrolling of the display view 502. Similarly, tilting or vertical panning of a mobile device can cause corresponding vertical scrolling of the display view 502. In other implementations, the display view 502 can be scrolled with respect to the image 500 based on other input, e.g., user input indicating a particular orientation or a direction and/or magnitude of scrolling. For example, a user can provide touch input such as swiping over a touchscreen to change the orientation of the display view 502, or can provide user input via a cursor and/or input device (e.g., mouse, joystick, displayed or physical buttons, etc.).

In some implementations, panoramic image 500 can be displayed on multiple screens, e.g., two screens of virtual reality goggles, with one screen positioned in front of each eye of a user, and providing stereoscopic adjustment to the image screens, e.g., to provide a three-dimensional view of the image content.

Figure 6:
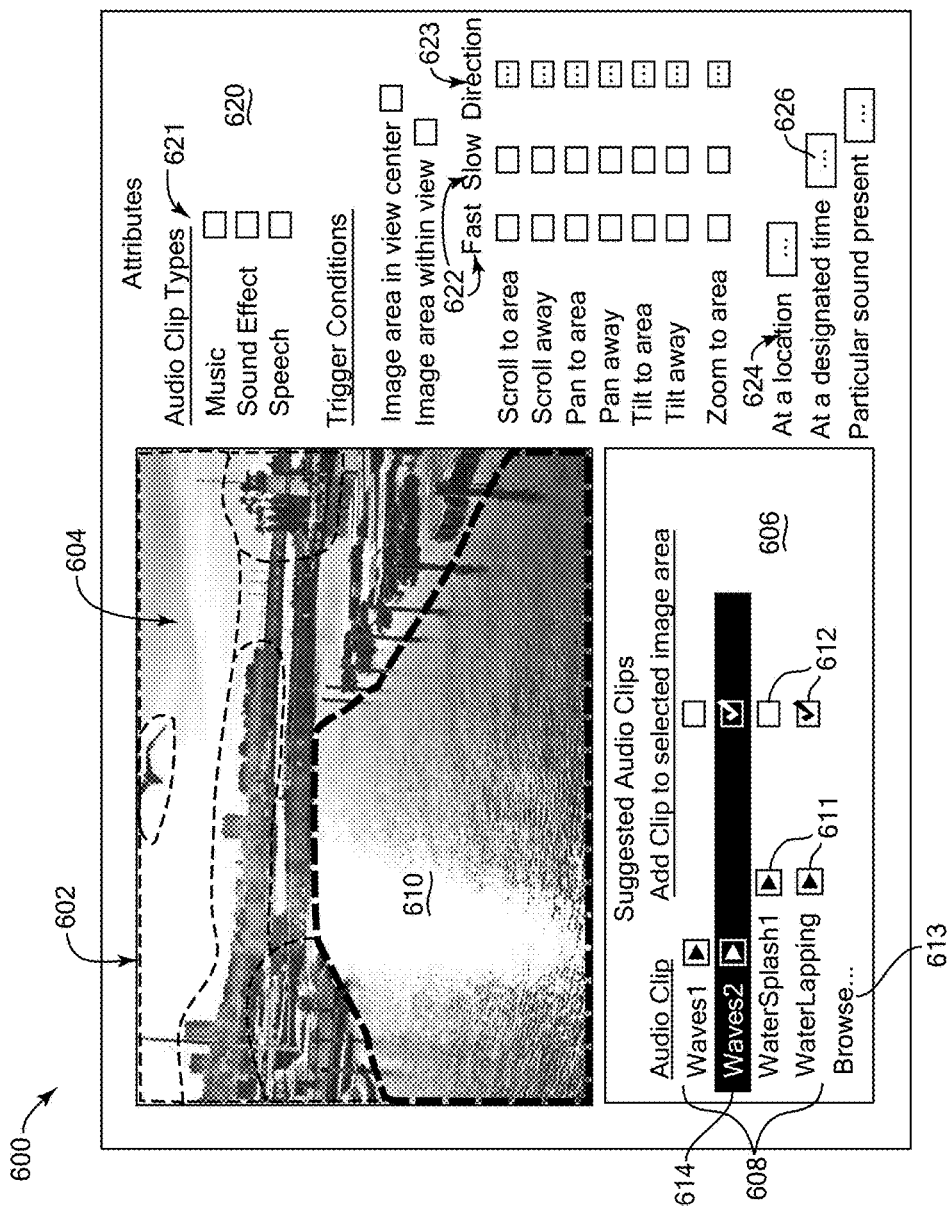
FIG. 6 is a diagrammatic illustration of an example graphical user interface displaying one or more options allowing a user to specify audio segments and other features for a panoramic image, according to some implementations.

The panoramic image 500 can include defined portions of the image which each can be associated with one or more respective audio segments as described herein. In some implementations, image portions can be automatically detected in the image by a system using one or more image detection techniques. For example, image content features such as faces, sky, water, objects, etc., can be detected and designated as different portions of the image. In some implementations, one or more users can provide input to manually define one or more portions in the image (an example of which is shown in FIG. 6). The system can assign one or more audio segments to the detected portions as described herein, e.g., automatically or based on user input provided in a user interface.

In the example of FIG. 5, the panoramic image 500 includes several portions defined to be associated with audio segments, where the borders of such portions are indicated by dashed lines in the example of FIG. 5 (in some implementations, the dashed lines can be displayed in some viewing modes, and not displayed in other viewing modes). For example, a portion 510 includes a sky region depicting a sky of an outdoor scene depicted in the image 500, where portion 510 extends over the width of image 500. In some examples, the portion 510 can be associated with an audio segment that outputs a sound of wind. In this example, an audio segment is associated with a sub-portion 512 of portion 510 that is defined around a depiction of a bird appearing in the sky region. In some implementations, an audio segment is associated with the sub-portion 512 that outputs a sound of birds. In various implementations, the audio segment associated with sub-portion 512 is associated with one or more trigger conditions that cause the output of the bird sound audio segment instead of (or in addition to) the wind audio segment of portion 510. For example, one or more of the trigger conditions can include the sub-portion 512 being included in the display view 502, or (as a more restrictive trigger condition), the display view 502 being centered on the sub-portion 512. Other examples of trigger conditions for the bird sound audio segment include moving (e.g., scrolling) the display view 502 slower than a predefined threshold speed from a different area of the image 500 to an area such that at least a part of sub-portion 512 in included in the display view 502. If the view is scrolled faster than the threshold speed, the audio segment of the portion 510 is output instead.

In further examples, a portion 514 includes a city region depicting buildings of a city as depicted in the image 500, where portion 514 is adjacent to the sky region portion 510. In some examples, portion 514 can be associated with an audio segment that outputs a sound of a bustling city, e.g., traffic and vehicle sounds. The audio segment can be associated with a trigger condition such that, for example, if a part of the portion 514 occupies a majority of the area of the display view 502, the city audio segment is output instead of other audio segments of other portions displayed in the view (or is output at a louder volume than other audio segments associated with other portions in the view).

In further examples, a portion 516 includes a depiction of a lighthouse. In some examples, portion 516 can be associated with an audio segment that outputs a sound of a lighthouse (e.g., fog horn). The audio segment can be associated with a trigger condition such that, for example, if a part of the portion 514 is displayed such that it occupies a center of the display view 502, the lighthouse audio segment is output instead of other audio segments of other portions displayed in the view (or is output at a louder volume than other audio segments associated with other portions in the view). In addition, another trigger condition causes the output of the audio segment only if the current time of day is determined to be such that it is dark outside (e.g., based on a clock and data indicating sunrise and sunset schedules for a detected region of the user device, if user consent has been obtained).

In further similar examples, a portion 518 includes a depiction of water. In some examples, portion 518 can be associated with a first audio segment that outputs a sound of water, e.g., the sound of waves on a beach. The trigger condition for the output of the first audio segment is scrolling the view such that the portion 518 is in the center of the view, at a speed under a particular threshold speed. The portion 518 is also associated with a second audio segment that outputs the sound of a boat moving across water, with a trigger condition of scrolling the view to display the portion 518, where the view is scrolled at a speed above the threshold speed.

In another example, a portion 520 includes a depiction of several boats. In some examples, portion 520 can be associated with an audio segment that outputs a sound of a boat, e.g., the sound of a boat traveling through water, etc. The audio segment associated with this image portion can, for example, have a trigger condition of displaying the portion 520 such that it occupies a majority of the display view 502.

In another example, a portion 522 includes a depiction of several people. In some examples, portion 522 can be associated with a first audio segment that outputs a sound of a crowd of people talking, e.g., as a background sound with indistinguishable words. Portion 522 is also associated with a second audio segment that outputs a sound of talking with distinguishable words, which has a trigger condition such that it is output instead of the first audio segment only if the display view 502 is zoomed in from a wider view to a closer view in which the people are displayed at a particular size or larger.

In some implementations, the panoramic image 500 can be an image montage that includes areas that have been updated with different image portions or video clips from different source images or video data. In some implementations, the edges of an image portion added to the image montage can be visually blended into surrounding, existing image portions of the image montage, e.g., with blur effects.

Other types of panoramic images can be displayed similarly to spherical panoramic images described herein. For example, cylindrical images can be displayed as virtual projections on the inside surface of a cylinder with the view at or near a midpoint, or any other point, inside the cylinder. In some implementations, a view portion of the cylindrical image can be displayed in the view based on the current orientation of the view. Some implementations can project the viewable area of the image on the curved surfaces of the cylinder, with no image content projected on the flat surfaces of the cylinder. In some implementations, the view can be constrained to one or more particular viewable areas of the cylindrical image. In various implementations, a particular panoramic image may be displayed as a projection on any three-dimensional shape, such as a sphere, cylinder, cube, ovoid, polyhedron, flat or curved plane, etc. e.g., by suitably adapting the panoramic image based on the shapes.

FIG. 6 shows an example graphical user interface 600 displaying one or more options allowing a user to specify audio segments and other features for a panoramic image. User interface 600 can be displayed on a display screen of a device and can receive user input from a user using any of various input devices, e.g., touchscreen, pointing device, voice input to a microphone, etc.

In the example user interface 600 of FIG. 6, a display window 602 displays a portion 604 of a panoramic image. For example, the panoramic image may have been selected by a user who is using the user interface 600, or the panoramic image may have been automatically selected, e.g., based on user preferences. In this example, displayed image portion 604 is similar to a portion of image 500 shown in FIG. 5. A number of defined areas or portions of the image portion 604 have been indicated with dashed lines. In some implementations, the defined areas can be displayed in the user interface 600. For example, defined areas can be manually defined by a user (e.g., by controlling a displayed cursor with a pointing device) and/or can be automatically detected by a system, e.g., based on detection of image features in the panoramic image using image recognition techniques. In some examples, the user can select one or more pixels, and the system can detect an image feature that includes the selected pixel(s) and designate the image feature as a defined portion of the image. In some implementations, a user can define a portion by drawing or tracing a shape onto the image, e.g., using a touchscreen, stylus, mouse, or other pointing device. The drawn shape can define a portion of the image.

In the displayed image portion 604, the user has selected an area 610, which is indicated by the heavier dashed line in the example of FIG. 6. Some implementations can display the dashed line defining the selected area 610, or can highlight the selected area 610 in some other way (e.g., display the area in a different color, shade, brightness, pattern, etc.). The selected area 610 depicts a body of water within the image portion 604.

In an audio segment display area 606 of the user interface 600, one or more identifiers of audio segments (e.g., audio clips) can be displayed. In this example, a system has determined one or more image characteristics of the selected image area 610 and has determined a number of suggested audio segments which have been automatically determined to be related to the selected area 610 of the image portion 604. For example, the four suggested audio segments 608 have been determined to be related to the image feature of water that has been detected in the selected area 610 using one or more image recognition techniques. In some implementations, the suggested audio segments 608 can be determined from an accessed database which organizes and stores a collection of audio segments based on types of image content, subject categories, etc.

Each audio segment 608 can be displayed next to a play button 611 that, when selected by user input, allows a user to hear the associated audio segment or a portion thereof (e.g., in some implementations a slider bar can be displayed in response to selecting the button 611, where the slider bar represents the time span of the associated audio segment, and which allows a user to select to play any portion of the audio segment). In this example, a selection box 612 can be displayed for each audio segment to allow the user to select to associate the associated audio segment to the selection area 610 of the image portion 604. In some implementations, if multiple audio segments are selected to be associated with the selected area of the image, additional options (not shown) are displayed to allow the user to select the relative volume or loudness of the selected audio segments with respect to each other, the relative priority of the audio segments, any linking of the audio segments (e.g., one being output after the other), etc.

Some implementations can provide one or more user interface controls (e.g., browse selection 613) to cause a list of audio segments to displayed, from which the user can select one or more audio segments to be associated with the selected image area 610. In various implementations, one or more of the suggested audio segments and/or other selectable audio segments can be audio segments (e.g., files or other data) stored locally on the user device, and/or available from remote storage over a network. In some implementations, one or more audio segments can be authored by various users and made available for sharing (if user consent has been obtained) to user devices over a shared network resource, e.g., a server system 102.

In some implementations, if one of the audio segments 608 is selected, a number of available audio segment attributes 620 are displayed that can be selected for (associated with) the selected audio segment. For example, audio segment 614 is selected in the example user interface 600, and the list of available audio segment attributes 620 is displayed in response, which may be associated with audio segment 614.

In this example, a number of types 621 are displayed, allowing a user to assign a designated type to the selected audio segment (e.g., some trigger conditions may be dependent on a particular type of audio segment). In addition, a number of trigger condition attributes are displayed, which are conditions that will cause the selected audio segment 614 to be output during a display of at least a part of the image portion 604. For example, trigger conditions such as the selected image area being positioned at the center of a display view (e.g., display view 502), the selected image area being positioned anywhere within the display view, a scroll of the display view to the selected image area, a scroll of the display view away from the selected image area, pans or tilts toward or away from the selected image area, a zoom toward or away from the selected image area, etc. In some examples, a speed of the scrolling, panning, or tilting can be selected as indicated by the fast or slow columns 622 of selection boxes. The fast and slow selections can each be associated with particular predefined ranges of rate or speed, for example, e.g., default ranges or ranges that are defined by user input. Some implementations can allow the user to specify one or more particular directions for the scroll, pan, tilt, or zoom to trigger the associated audio segment, e.g., by selecting a control in direction column 623 that allows the user to further specify the direction(s), such as left, right, up, down, a particular angle, zoom in, zoom out, etc. For example, each such direction can be associated with a range of directions, e.g., an "up" direction that is associated with a particular angular range surrounding the particular "up" direction that is parallel to a vertical axis of the display.

In this example, some trigger conditions 624 can include a button 626 to allow the user to specify additional details of the trigger condition, e.g., from a list of displayed options. For example, a particular location or range of location coordinates, a particular time (e.g., specific time, time of day, calendar date, day or night, etc.), a particular type of ambient sound being present in the environment of the device providing the displayed view (e.g., rain, traffic, voices, etc.), etc. can be specified.

Various other trigger conditions can be presented as selectable by user input in various implementations, examples of which are described herein, e.g., for other types of user input (e.g., gestures), image characteristics, device characteristics, environmental characteristics, etc. For example, any of the various trigger conditions and/or other attributes described herein can be listed in various user interface implementations to allow the user to select various attributes for particular audio segments.

Some implementations can include one or more attributes to allow the associated audio segment to be designated by the user whether it is to play continuously after being triggered (e.g., loop so that its output starts at its beginning after reaching its end), play one time when triggered, play a user-specified number of times when triggered, etc. One or more attributes of an audio segment can be selected by the user to specify a particular channel or direction for the audio segment, e.g., a left or right channel in a stereo audio configuration, or other available channel. Such an audio segment is to be output by the designated channel and corresponding speaker or other audio output device, e.g., if a trigger condition for the audio segment is satisfied. For example, an audio segment can be designated to be output from a left channel if the display view is moved (e.g., scrolled) in a right direction across the panoramic image.

In some implementations, the entire panoramic image can be associated with one or more audio segments. For example, if no portions of the displayed panoramic image have been selected in the user interface 600, one or more suggestions of audio segments for the entire image can be displayed and customized similarly as described for image portions. Selected audio segments can be associated with the entire image and triggered based on one or more trigger conditions, e.g., types of user input, image characteristics that are currently displayed in the display view, device characteristics, environmental characteristics, etc.

In some implementations, the selected area 610, other detected areas of the panoramic image, and/or the entire panoramic image, can each be associated with one or more respective attributes. In some implementations, such image attributes can be displayed in a user interface similarly to audio segment attributes 620. In some examples, image attributes can include tags or labels describing content of the associated image area, restrictions on which audio segments can be associated with the image area, a designated maximum (or minimum) number of audio segments allowed to be associated with the image area, etc. For example, restrictions can restrict the image area to be associated only with audio segments that have (or do not have) a particular set of attributes, where the attributes can be any of the attributes described herein for audio segments.

Any of the described user interface controls can be implemented as other various types of controls in various implementations, such as drop-down menus, radio buttons, input fields for text, sliders, buttons, hover selections, context menus, or other displayed controls.

The blocks and operations described in the methods disclosed herein can be performed in a different order than shown or described, and/or performed simultaneously (partially or completely) with other blocks, where appropriate. Some blocks can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices 120, 122, 124, or 126 as shown in FIG. 1. In some implementations, one or more methods described herein can be implemented, for example, on a server system 102 as shown in FIG. 1, and/or on both a server system and a client system. In some implementations, different components of one or more servers and/or clients can perform different blocks, operations, or other parts of the methods.

Figure 7:
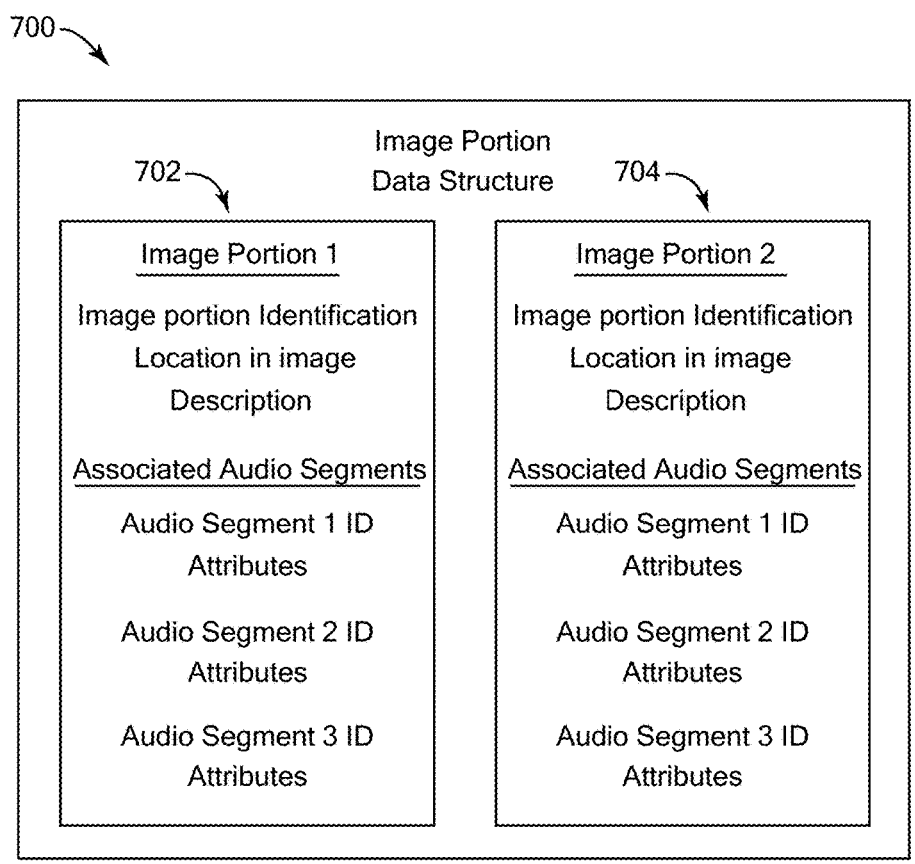
FIG. 7 is a diagrammatic illustration of one example of a data structure for an image portion of a panoramic image, according to some implementations.

FIG. 7 is a diagrammatic illustration of one example of a data structure 700 for a panoramic image, which describes one or more image portions of the panoramic image and associated audio segments. Data structure 700 includes a data section defining each image portion of the panoramic image. In this example, data section 702 is for one image portion and data section 704 is for a second image portion of the panoramic image. Each data section 702 and 704 includes an image portion definition that defines the image portion. For example, the image portion definition includes an image portion identification, a location in the panoramic image at which the image portion is positioned (e.g., coordinates), and a description of the image portion, such as a description of the shape, size, border, etc. of the image portion. Each data section 702 and 704 also includes data for the audio segments associated with the respective image portion. For example, the audio segment data includes, for each audio segment, an identification of the audio segment and one or more attributes as described herein.

Figure 8:
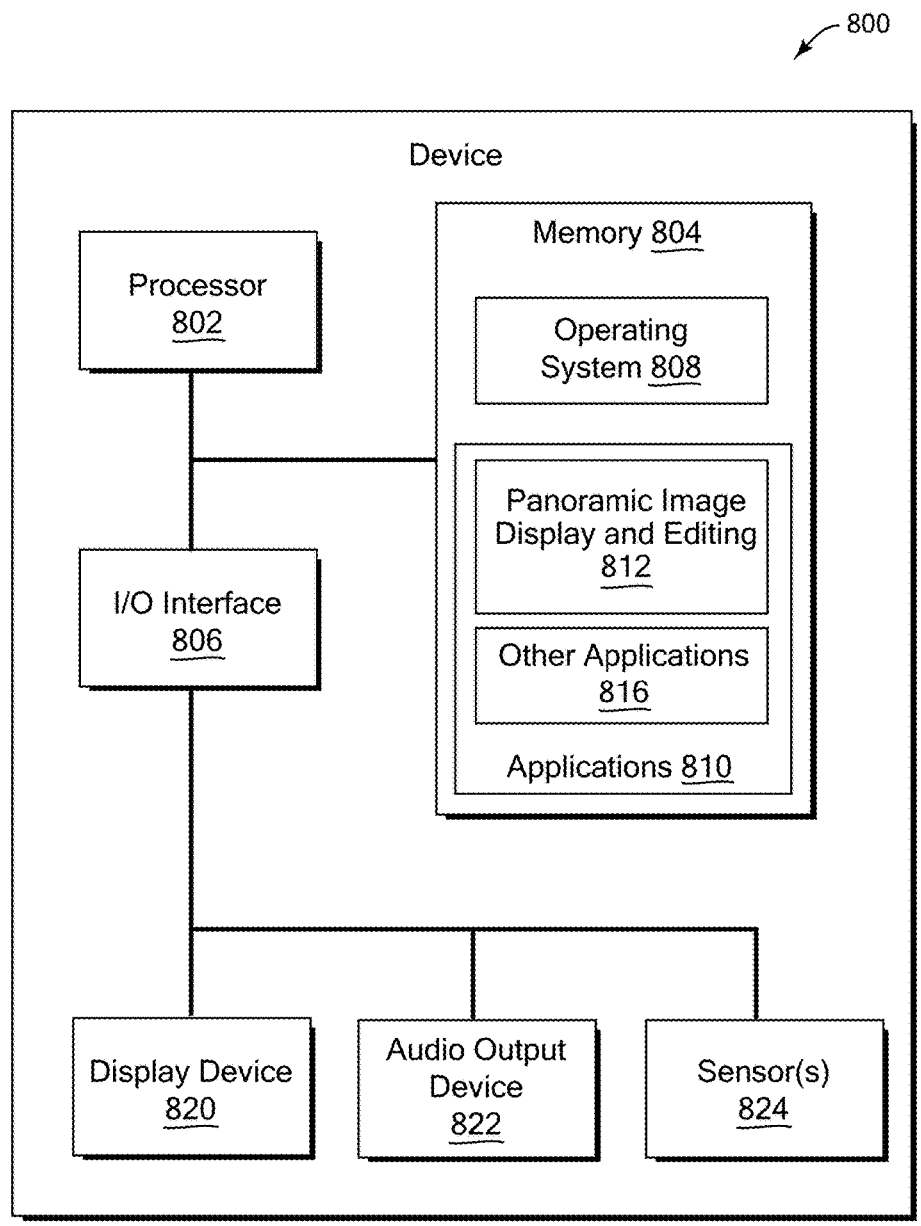
FIG. 8 is a block diagram of an example device which may be used for one or more implementations described herein.

FIG. 8 is a block diagram of an example device 800 which may be used to implement one or more features described herein. In one example, device 800 may be used to implement a client device, e.g., any of client devices 120-126 shown in FIG. 1. Alternatively, device 800 can implement a server device, e.g., server device 104 of FIG. 1. Device 800 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 800 includes a processor 802, a memory 804, and input/output (I/O) interface 806. Processor 802 can be one or more hardware processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808 and one or more applications 810 such as a data display engine, web hosting engine, image display engine, notification engine, social networking engine, etc. In some implementations, the applications 810 can include instructions that enable processor 802 to perform functions described herein, e.g., some or all of the methods of FIGS. 2, 3, and 4. For example, applications 810 can include one or more panoramic image display and editing applications 812, including a program to receive, display, and enable updating of panoramic images and audio segments, and store related data as described herein. One or more of the applications can, for example, provide a displayed user interface responsive to user input to display selectable options or controls, and data based on selected options. One or more of the applications can, for example, be viewing applications causing display of a panoramic image and causing output of associated audio segments based on the display as described herein. One or more of the applications can, for example, be panoramic image editing applications allowing assigning of audio segments to panoramic images and editing of characteristics and conditions associated with the audio segments as described herein. Other applications or engines 816 can also or alternatively be included in applications 810, e.g., image editing applications, media display applications, communication applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 804 can alternatively be stored on any other suitable storage location or computer-readable medium. In addition, memory 804 (and/or other connected storage device(s)) can store panoramic images, component image portions and related data structures, parameters, audio data, user preferences, and/or other instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. Interfaced devices can be included as part of the device 800 or can be separate and communicate with the device 800. For example, network communication devices, storage devices (e.g., memory and/or database 106), and input/output devices can communicate via I/O interface 806. In some implementations, the I/O interface can connect to interface devices such as input devices (keyboard, pointing device, touchscreen, microphone, camera, scanner, sensors, etc.) and/or output devices (display device, speaker devices, printer, motor, etc.).

Some examples of interfaced devices that can connect to I/O interface 806 include a display device 820 that can be used to display content, e.g., images, video, and/or a user interface of an output application as described herein. Display device 820 can be connected to device 800 via local connections (e.g., display bus) and/or via networked connections and can be any suitable display device. The display device 820 can include any suitable display device such as an LCD, LED, or plasma display screen, CRT, television, monitor, touchscreen, 3-D display screen, or other visual display device. For example, display device 820 can be a flat display screen provided on a mobile device, multiple display screens provided in a goggles device, or a monitor screen for a computer device.

The I/O interface 806 can interface to other input and output devices. Some examples include one or more cameras, which can capture images. An audio output device 822 can include one or more speakers or other devices that can output audio based on electronic signals, e.g., signals provided to the audio output device 822 based on data in output audio segments described herein. Orientation sensors 824, e.g., gyroscopes and/or accelerometers, can provide sensor data indicating device orientation (which can correspond to view orientation in some implementations) and/or camera orientation. Some implementations can provide a microphone for capturing sound (e.g., voice commands, etc.), audio speaker devices for outputting sound, or other input and output devices.

For ease of illustration, FIG. 8 shows one block for each of processor 802, memory 804, I/O interface 806, and software blocks 808 and 810. These blocks may represent one or more processors or processing circuitries, operating systems, memories, I/O interfaces, applications, and/or software modules. In other implementations, server device 800 may not have all of the components shown and/or may have other elements including other types of elements instead of, or in addition to, those shown herein. While server system 102 is described as performing blocks and operations as described in some implementations herein, any suitable component or combination of components of server system 102 or similar system, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:
1. A computer-implemented method comprising:
causing a first portion of a panoramic image to be displayed by a display device of a user device;
receiving user input at the user device;
based on the user input:
determining at least a part of a second portion of the panoramic image for display, the second portion associated with a first audio segment and a second audio segment, wherein the first audio segment is associated with a first range of scrolling rate and the second audio segment is associated with a second range of scrolling rate;
causing a change in display of the panoramic image, wherein the change includes transitioning the display from the first portion to the second portion, wherein the transitioning includes scrolling the panoramic image within a display view of the user device;
selecting one of the first audio segment and the second audio segment based on the user input and based on at least one of: a rate of the transitioning or a direction of the transitioning, wherein selecting one of the first audio segment and the second audio segment includes:
selecting the first audio segment in response to the scrolling of the panoramic image being at a rate within the first range of scrolling rate, and
selecting the second audio segment in response to the scrolling of the panoramic image being at a rate within the second range of scrolling rate; and
causing output of the selected audio segment by an audio output device in communication with the user device.
2. The computer-implemented method of claim 1 wherein the user input includes a gesture provided by a user on a touchscreen of the display device, and wherein selecting one of the first audio segment and the second audio segment is based on a type of the gesture.
3. The computer-implemented method of claim 1 wherein the first audio segment is associated with a first range of zooming rate and the second audio segment is associated with a second range of zooming rate, wherein the transitioning includes zooming the panoramic image within a display view of the user device, and wherein selecting one of the first audio segment and the second audio segment includes:

selecting the first audio segment in response to the zooming of the panoramic image being at a rate within the first range of zooming rate, and selecting the second audio segment in response to the zooming of the panoramic image being at a rate within the second range of zooming rate.

4. The computer-implemented method of claim 1 wherein selecting one of the first audio segment and the second audio segment is further based on one or more stored user preferences.

5. The computer-implemented method of claim 1 further comprising determining at least one image characteristic associated with the second portion of the panoramic image, wherein selecting one of the first audio segment and the second audio segment is further based on the at least one image characteristic associated with the second portion.

6. The computer-implemented method of claim 1 wherein selecting one of the first audio segment and the second audio segment is further based on one or more device characteristics of the user device, wherein the device characteristics include at least one of: an orientation of the user device in space, and a sensed motion of the user device in space.

7. The computer-implemented method of claim 1 wherein selecting one of the first audio segment and the second audio segment is further based on one or more current environmental characteristics of the user device, wherein the current environmental characteristics include at least one of: a current time, a current date, and a geographic location of the user device.

8. The computer-implemented method of claim 1 wherein selecting one of the first audio segment and the second audio segment is further based on an ambient sound level surrounding the user device.

9. The computer-implemented method of claim 1 wherein selecting one of the first audio segment and the second audio segment is further based on a respective priority level associated with each of the first audio segment and the second audio segment.

10. The computer-implemented method of claim 1 wherein the first range of scrolling rate does not overlap the second range of scrolling rate.

11. The computer-implemented method of claim 1 wherein causing the first portion of the panoramic image to be displayed includes causing a spherical display of the first portion, and wherein the transitioning the display from the first portion to the second portion includes causing a spherical display of the second portion.

12. A device comprising:
a memory;
a display device;
an audio output device; and
at least one processor coupled to the display device and to the audio output device and configured to access the memory, the at least one processor configured to perform operations comprising:
causing a first portion of a panoramic image to be displayed by the display device;
receiving user input at the device;
based on the user input,
determining at least part of a second portion of the panoramic image for display, the second portion associated with a first audio segment and a second audio segment, wherein the first audio segment is associated with a first range of zooming rate and the second audio segment is associated with a second range of zooming rate;
causing a change in display of the panoramic image, wherein the change includes transitioning the display from the first portion to the second portion, wherein the transitioning includes zooming the panoramic image within a display view on the display device;
selecting one of the first audio segment and the second audio segment based on the user input and based on at least one of: a rate of the transitioning or a direction of the transitioning, wherein selecting one of the first audio segment and the second audio segment includes:
selecting the first audio segment in response to the zooming of the panoramic image being at a rate within the first range of zooming rate, and
selecting the second audio segment in response to the zooming of the panoramic image being at a rate within the second range of zooming rate; and
causing output by the audio output device of the selected one of the first audio segment and the second audio segment.

13. The device of claim 12 wherein the at least one processor is configured to perform operations further comprising detecting at least one image content feature depicted in the at least part of the second portion of the panoramic image,
wherein the at least one processor is configured to perform the selecting one of the first audio segment and the second audio segment further based on the at least one image content feature and to include:
determining one or more image content categories of the at least one image content feature; and
determining which of the first audio segment and the second audio segment is triggered by the one or more image content categories,
wherein the selected audio segment corresponds to the triggered one of the first audio segment and the second audio segment.

14. The device of claim 13 wherein the at least one processor is configured to perform the determining which of the first audio segment and the second audio segment is triggered by the one or more image content categories to include:
determining one or more audio categories for the first audio segment and the second audio segment; and
determining which of the one or more audio categories is associated with the one or more image content categories based on stored associations, wherein the triggered one of the first audio segment and the second audio segment has the associated one or more audio categories.

15. The device of claim 12 wherein the at least one processor is configured to perform the selecting one of the first audio segment and the second audio segment further based on the change in the display of the panoramic image caused by the user input.

16. A non-transitory computer readable medium having stored thereon software instructions that, when executed by a processor, cause the processor to perform operations including:
causing a first portion of a panoramic image to be displayed by a display device of a user device;
receiving user input at the user device;
based on the user input:
determining at least a part of a second portion of the panoramic image for display, the second portion associated with a first audio segment and a second audio segment, wherein the first audio segment is associated with a first range of scrolling rate and the second audio segment is associated with a second range of scrolling rate, wherein the first range of scrolling rate does not overlap the second range of scrolling rate;

causing a change in display of the panoramic image, wherein the change includes transitioning the display from the first portion to the second portion, wherein the transitioning includes scrolling the panoramic image within a display view of the user device;

selecting one of the first audio segment and the second audio segment based on the user input and based on at least one of: a rate of the transitioning or a direction of the transitioning, wherein selecting one of the first audio segment and the second audio segment includes:
- selecting the first audio segment in response to the scrolling of the panoramic image being at a rate within the first range of scrolling rate, and
- selecting the second audio segment in response to the scrolling of the panoramic image being at a rate within the second range of scrolling rate; and causing output of the selected audio segment by an audio output device in communication with the user device.

* * * * *